United States Patent [19]

Codilian et al.

[11] Patent Number: 5,471,353
[45] Date of Patent: Nov. 28, 1995

[54] DISK DRIVE EMPLOYING MULTI-MODE SPINDLE DRIVE SYSTEM

[75] Inventors: Raffi Codilian, San Dimas; Donald Stupeck, Laguna Hills, both of Calif.

[73] Assignee: Western Digital (Sea), Pte., Ltd., Singapore, Singapore

[21] Appl. No.: 992,743

[22] Filed: Dec. 18, 1992

[51] Int. Cl.[6] .................................. G11B 19/28
[52] U.S. Cl. ................ 360/73.03; 360/71; 318/278
[58] Field of Search ................ 360/73.03, 74.1, 360/71, 75, 77.08; 318/271, 272, 277, 278

[56] References Cited

U.S. PATENT DOCUMENTS

| | | | |
|---|---|---|---|
| 4,458,273 | 7/1984 | Johnson | 360/74.1 |
| 4,755,892 | 7/1988 | Carteau et al. | 360/75 |
| 4,970,610 | 11/1990 | Knappe | 360/73.03 X |
| 5,170,299 | 12/1992 | Moon | 360/77.08 |
| 5,210,474 | 5/1993 | Oswald | 318/254 |
| 5,225,759 | 7/1993 | Endo et al. | 318/254 |

FOREIGN PATENT DOCUMENTS 1-283090  11/1989  Japan ................. 360/73.03

*Primary Examiner*—Aristotelis Psitos
*Assistant Examiner*—James T. Wilson
*Attorney, Agent, or Firm*—Graham & James

[57] ABSTRACT

A disk drive system for use in limited power applications is disclosed. The disk drive includes a spindle motor having two or more windings, along with a spindle motor driver which can drive the spindle motor in any of a unipolar, bipolar or tripolar mode. The bipolar or tripolar mode is used to start the disk drive and then the unipolar mode is used to operate the disk drive while data is being retrieved. By combining the three drive modes a large start current reduction and higher rotation velocities are achieved. Current consumption is further minimized by adaptively transitioning from bipolar to unipolar modes of operation. The disclosure also includes a general methodology for optimal motor $K_E$ and $K_M$ parameter selection.

2 Claims, 24 Drawing Sheets

| PHASE | CURRENT DIRECTIONS | TERMINAL | | |
|---|---|---|---|---|
| | | 300 | 302 | 304 |
| AB | a + b | H | L | L* |
| | | 406 = ON | 412 = ON | 418 = ON |
| BC | b + c | H | H* | L |
| | | 406 = ON | 410 = ON | 418 = ON |
| CD | c + d | L* | H | L |
| | | 408 = ON | 410 = ON | 418 = ON |
| DE | d + e | L | H | H* |
| | | 408 = ON | 410 = ON | 420 = ON |
| EF | e + f | L | L* | H |
| | | 408 = ON | 412 = ON | 420 = ON |
| FA | f + a | H* | L | H |
| | | 406 = ON | 412 = ON | 420 = ON |

* INDICATES CURRENT SWITCH

FIG. 7

| PHASE | CURRENT DIRECTIONS | TERMINAL | | |
|---|---|---|---|---|
| | | 300 | 302 | 304 |
| A | a | H<br>406 = ON | L<br>412 = ON | X |
| B | b | H<br>406 = ON | X | L<br>418 = ON |
| C | c | X | H<br>410 = ON | L<br>418 = ON |
| D | d | L<br>408 = ON | H<br>410 = ON | X |
| E | e | L<br>408 = ON | X | H<br>420 = ON |
| F | f | X | L<br>412 = ON | H<br>420 = ON |

FIG. 8

| PHASE | CURRENT DIRECTION | TERMINAL | | | |
|---|---|---|---|---|---|
| | | 300 | 302 | 304 | 306 |
| A | a | H<br>406 = ON | X | X | L<br>414 = ON |
| B | b | X | H<br>410 = ON | X | L<br>414 = ON |
| C | c | X | X | H<br>420 = ON | L<br>414 = ON |

FIG. 10(a)

| PHASE | CURRENT DIRECTION | TERMINAL | | | |
|---|---|---|---|---|---|
| | | 300 | 302 | 304 | 306 |
| A | d | L<br>406 = ON | X | X | H<br>414 = ON |
| B | e | X | L<br>410 = ON | X | H<br>414 = ON |
| C | f | X | X | L<br>420 = ON | H<br>414 = ON |

FIG. 10(b)

| PHASE | CURRENT DIRECTIONS | TERMINAL | | | |
|---|---|---|---|---|---|
| | | 300 | 302 | 304 | 306 |
| A | a | H<br>406 - ON | X | X | L<br>414 - ON |
| B | f | X | X | L<br>418 - ON | H<br>416 - ON |
| C | b | X | H<br>410 - ON | X | L<br>414 - ON |
| D | d | L<br>408 - ON | X | X | H<br>416 - ON |
| E | c | X | X | H<br>420 - ON | L<br>414 - ON |
| F | e | X | L<br>412 - ON | X | H<br>416 - ON |

FIG. 10(c)

DISK DRIVE EMPLOYING MULTI-MODE SPINDLE DRIVE SYSTEM

BACKGROUND OF THE INVENTION

1. Field of the Invention

The present invention relates to data storage devices. More particularly, the present invention relates to rotating disk magnetic data storage devices.

2. Description of the Prior Art

Rotating disk magnetic storage devices, commonly referred to as "disk drives", have undergone dramatic improvements in physical size versus data storage capacity in recent years. For example, disk drives having data storage capacities of 40 to 80 megabytes in a package of less than 10 cubic inches are not uncommon. These physically smaller disk drives usually have correspondingly reduced power requirements.

Similarly, portable computers have also undergone dramatic improvements in recent years so that high-performance, battery-powered portable computers are now readily available. Thus, a modern portable computer weighing only a few pounds has most of the storage, display, and computing capabilities of a desk-top model. As a result, modern portable computers require relatively large data storage capacities in an environment limited both in physical size and available electrical power.

Accordingly, for portable computers which use batteries to provide electrical power, continuous operation of a disk drive may be power intensive and result in limited operating time between battery replacement or recharging. The constraints imposed on portable computers have thus created a significant need for a large capacity disk drive having a relatively low power consumption.

The power consuming components of a disk drive may be generally divided into analog and digital sections. The digital section is related to disk and read/write control functions. The analog sections are the data read/write processing section and the motor control sections. The most power intensive sections are those related to motor control; i.e. the actuator motor which drives the supporting actuator for the read/write transducer heads, the spindle drive system which controls the spindle motor which rotates the magnetic data storage disk, and the associated drive electronics. In particular, the spindle drive system and spindle motor require significant power both to overcome stiction in order to initially start the magnetic storage disk, accelerate to the desired operating speed, and to rotate the magnetic storage disk at a constant velocity in order to "fly" the read/write transducer during data read/write and track following operations.

The ability of the spindle drive system to meet the power consumption requirements of portable computers is directly affected by spindle motor size, winding energization mode and motor efficiency. The efficiency factor or "figure of merit" ("$K_M$") of the spindle motor is related to the physical size and design efficiency of the motor, and is proportional to the torque squared divided by the power dissipated within the windings. The torque, in turn, is proportional to the driving current of the windings. Since the power is proportional to the current squared, the $K_M$ is a constant for a given spindle motor design and its driving mode.

Conventionally, the motor design and driving mode is selected based upon two principal criteria: (1) the amount of stall torque first needed to overcome both the disk drive's stiction torque to effect relative motion of the read/write transducer heads and the cogging and bearing friction torque of the spindle; and (2) the amount of continuous torque then needed to rotate the magnetic storage disk at a constant velocity during data read/write and track following operations. In general, large disk drives have larger torque requirements than smaller disk drives. However, the amount of start torque needed by both large and small disk drives is typically large enough to require a considerable amount of drive current during startup, with considerably less drive current required once the target rotational velocity has been reached.

The number of disk start/stops versus runs, along with the corresponding start versus run times, also affects the overall power consumption. Starting the spindle motor requires relatively high torque for a short period of time, and also draws a relatively high current. Additionally, a disk drive adapted for use with a portable computer may be allowed to spin down after a short period of inactivity in order to conserve power. Thus, the frequency of start/stops of a spindle motor is much higher for the smaller disk drives. However, each time data is accessed after the drive is spun down, the high torque, high power start must be initiated. Therefore, repeated high power starts may offset any reduced power consumption achieved through spin down in a low power mode.

Accordingly, there is a need for a compact spindle drive system which is capable of starting a spindle motor, running the motor at a desired rotational velocity, and stopping the motor in a manner which provides an overall reduced power consumption.

SUMMARY OF THE INVENTION

The present invention is directed to a disk drive employing a spindle drive system having overall reduced power consumption and reducing peak power consumption (start up power), while providing performance similar to a more power intensive drive of similar configuration.

The disk drive of the present invention employs a spindle motor which provides reduced power consumption by employing multiple driving techniques as a function of spindle operating phase (e.g. startup or running phase). Specifically, the spindle motor driving techniques used by the present invention include unipolar mode, bipolar mode, and tripolar mode, and are selected depending on the torque required during a particular operating phase. For example, the bipolar or tripolar mode is preferably used during startup to provide the torque needed to overcome the stiction, cogging and bearing forces. The mode is then switched to the unipolar mode at a point during motor acceleration and the unipolar mode is employed to reach the operating velocity and maintain that velocity during the running phase. This multiple mode driving of the motor reduces the overall power consumption, in particular in an environment where the disk drive is repeatedly started and stopped due to power-down modes of the host computer.

More particularly, sufficient power must be provided to the spindle motor during startup to overcome inertial and frictional forces, such as stiction between the disk surface and the read/write transducer heads which may be resting on the disk surface in a landing zone. Stated differently, in accordance with conventional Winchester disk drive technology, an initial surge of power is needed to accelerate the motor sufficiently to "fly" the transducer heads above the disk surface, and additionally to accelerate the disks to the desired running speed.

In a preferred embodiment of the present invention, the bipolar mode is initially used at a more moderate torque level during startup of the disk drive. If the torque provided by the bipolar mode is insufficient to start the disk drive, then increased power is applied by switching to the tripolar mode which provides about 16 percent more torque. Since the bipolar mode motor design is designed to be successful a majority of times, the tripolar mode is rarely used and the net power savings of the switching method may be significant.

The present invention further provides optimal switching between driving modes. The voltage constant ("$K_E$") and run current ("$I_{Run}$") of the spindle motor depend on the number and type of windings and, under standard motor design practice, are specified for bipolar operation. The $K_E$ is reduced and the $I_{Run}$ is increased when the driving technique is switched from bipolar (two windings) to unipolar (one winding). Additionally, the maximum attainable velocity is inversely proportional to $K_E$. Therefore, higher velocities are attainable using the unipolar mode. However, since more drive current is drawn when using the unipolar mode the objective is to use the bipolar mode as long as the motor acceleration exceeds a predetermined amount. Thus, in accordance with the present invention, the switching time between modes is adaptively selected to occur before the maximum bipolar velocity is reached while the acceleration exceeds a predetermined amount in order to optimize the average power consumption.

The present invention also provides an optimized methodology of spindle motor and spindle drive system selection for a given disk storage system. With this methodology spindle motor $K_M$ and $K_E$ parameters are selected to satisfy the requirements of both the startup and running phases. Specifically, the physical configuration of the spindle motor is selected to minimize $K_M$, while staying within the required range, i.e. start the motor (which minimizes the motor size and weight), while the winding is selected to simultaneously maximize $K_E$ and stay within the required range i.e. to reach the target speed (which minimizes the motor drive current).

The present invention thus provides a spindle drive system having reduced power consumption while maintaining high performance. The present invention further provides a spindle motor and spindle drive system optimized to the overall requirements of a portable computer system.

Further features and advantages of the present invention will be appreciated by a review of the following detailed description of the preferred embodiment taken in conjunction with the following drawings.

BRIEF DESCRIPTION OF THE DRAWINGS

FIG. 7 is a table illustrating the tripolar control logic implemented by the spindle motor driver controller of the present invention;

FIG. 8 is a table illustrating the bipolar control logic implemented by the spindle motor driver controller of the present invention;

FIGS. 10(a)–10(c) are tables illustrating three embodiments of the unipolar control logic implemented by the spindle motor driver controller of the present invention;

DETAILED DESCRIPTION OF THE PREFERRED EMBODIMENT

Figure 1:
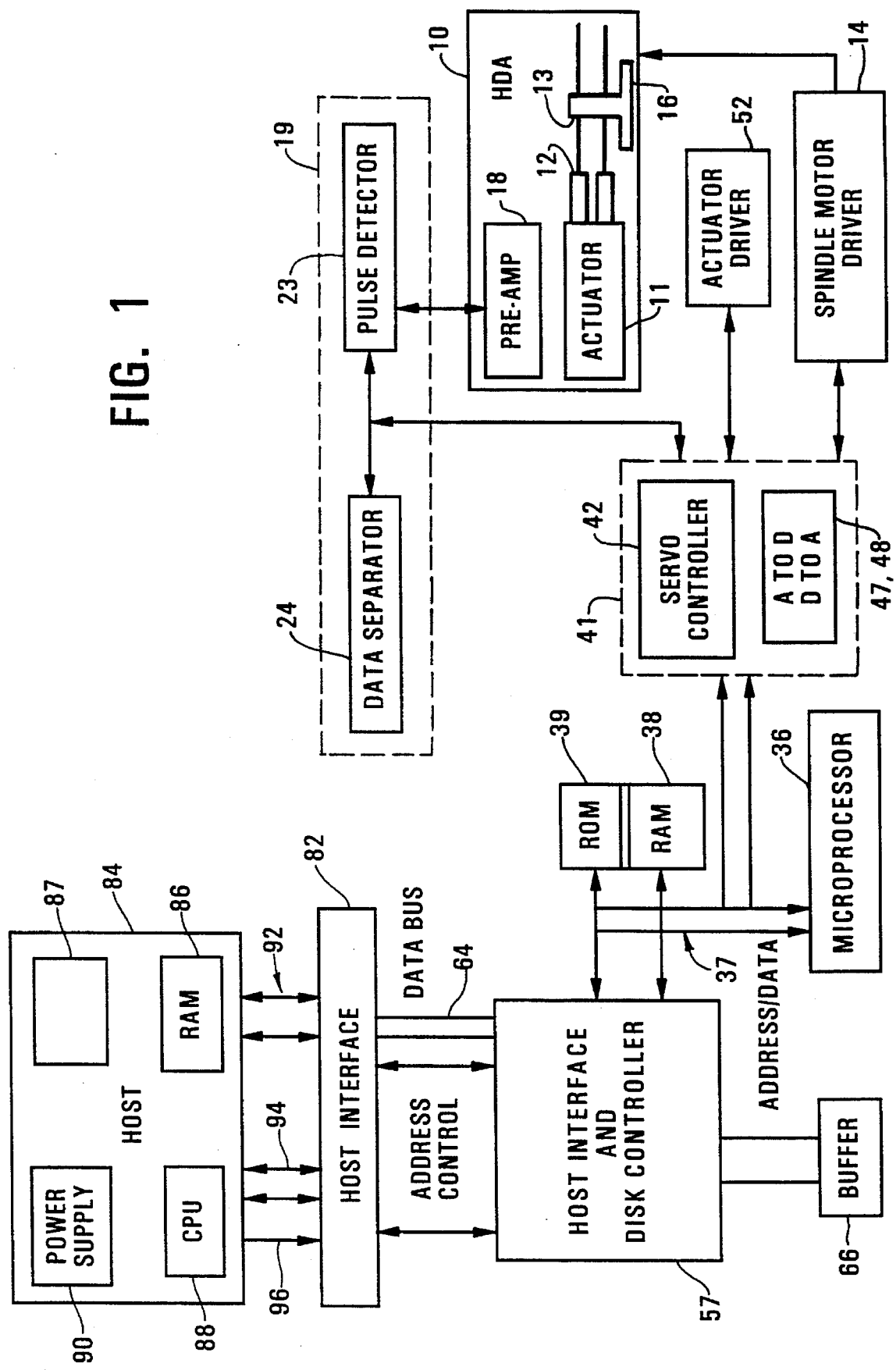
FIG. 1 is a functional block diagram illustrating the functional components of a disk drive system of the present invention.

In FIG. 1, the principal electrical and mechanical components of a disk drive constructed in accordance with a preferred embodiment of the present invention are illustrated.

Referring to FIG. 1, the disk drive includes a head/disk assembly (HDA) 10 having an actuator motor 11, the latter being preferably a voice coil type which positions one or more read/write heads 12 (four of which are shown in FIG. 1) to different radial positions relative to the surfaces of one or more magnetic disks 13 (two of which are shown in FIG. 1). HDA 10 also includes a read/write preamplifier and head multiplexer circuit 18 for controlling the writing of data to, and the reading of data and servo information from, the surfaces of magnetic disks 13. Circuit 18 may be a commercially available integrated circuit, for example, a type SSI 2020 circuit manufactured by Silicon Systems, Inc. of Tustin, Calif. Circuit 18 provides a write current to be supplied to the particular one of heads 12 selected for writing. Circuit 18 also contains a read preamplifier and a read buffer for supplying read data from the particular head selected for reading. A mode select signal determines whether circuit 18 is to operate in a read mode or a write mode.

A read channel/data separator circuit 19 receives analog read data from circuit 18 of HDA 10. Read channel circuit 19 includes a read channel analog filter (not shown) which supplies an analog signal to a pulse detector 23. The output of pulse detector 23 is then supplied to a data separator 24 as raw digital read data.

The disk drive circuit components communicate with a microcontroller 36 through a bus 37 which carries address, control and data information as is well known in the art. Microcontroller 36 is preferably a commercially available microprocessor-based controller, for example, an Intel model 87C196KD microcontroller. Microcontroller 36 has access to a random access memory (RAM) 38, which may be internal or external to the microcontroller 36, and a read only memory (ROM) 39, which may also be internal or external to microcontroller 36, as is conventional in the microcontroller art. Microcontroller 36 preferably has the capability to operate in one or more reduced power modes. For example, the noted Intel microcontroller has two reduced power modes called IDLE1 and IDLE2.

The disk drive control electronics further include a servo controller section 41 for detecting and processing servo control information from one or more of magnetic disks 13 relating to servo bursts, SYNC pulses and cylinder or track ID number indicating the radial position of heads 12 relative to the surface of magnetic disks 13. Servo controller section 41 connects to microcontroller 36 through bus 37 and operates to control the information flow relative to servo read timing and control. Servo controller section 41 preferably includes a servo controller 42, an analog-to-digital (A-to-D) converter circuit 47 and a digital-to-analog converter (DAC) circuit 48.

The analog output from servo controller section 41 is supplied as an input to an actuator driver circuit 52. Driver circuit 52 includes a power amplifier control circuit which supplies an actuator drive signal to a power amplifier (both not shown) which in turn supplies control current to actuator motor 11 in HDA 10. During power down sequencing, the actuator driver circuit 52 receives power from spindle motor 16 created by the back E.M.F. of spindle motor 16, thereby accommodating an automatic actuator retract capability in the absence of a drive power supply. The system shown in FIG. 1 also includes spindle motor control driver circuit 14 for controlling spindle drive motor 16 in HDA 10 for rotating magnetic disks 13.

The disk drive also includes a host interface and disk controller (HIDC) section 57. As is well known in the prior art, HIDC section 57 provides control and information to a host computer 84 through a bus 64 and a host interface 82. HIDC section 57 also provides control and information to the other elements of the disk drive through bus 37. A buffer memory 66 is preferably included with HIDC section 57 to accommodate differences in data flow rates between HIDC section 57 and host computer 84, and between HIDC section 57 and the elements of the disk drive.

As with microcontroller 36, HIDC section 57 is preferably provided with one or more reduced power operating modes. For example, an IDLE1 mode may be provided where the host interface portion of HIDC section 57 is fully active and the disk controller portion is inactive, and an IDLE2 mode may also be provided where the interface portion is also inactive except to receive a limited number of reset commands.

Host computer 84 preferably includes an operating RAM 86, a central processing unit (CPU) 88, a power supply 90 as well as other standard components such as keyboard and video monitor (not shown). Host computer 84 may also preferably have a suspend/resume button 87 which is used by the user to suspend the disk drive functions. Host computer 84 communicates with the disk drive via a data bus 92 and command control lines 94. Additionally, host computer 84 supplies power to the disk drive through power line 96.

Before discussing the particular drive modes used by the present invention to reduce power consumption, it is helpful to understand the operating environment of the disk drive. In both portable computers and desktop computers, the disk drive is used to store large amounts of digital data. During the operation of host computer 84, access to the stored data will be occasionally required. When this access is required, and reading or writing the data to or from magnetic disks 13 is occurring, all of the electrical and mechanical elements illustrated in FIG. 1 will be operational.

In particular, reading and writing the data requires that spindle motor 16 rotate magnetic disks 13, and that actuator 11 and actuator driver 52 are operative to seek a particular data track in order to locate the data stored in that track. Additionally, read channel 19 must be active in order to read or write data to or from magnetic disks 13. The other circuits within HDA 10, including microcontroller 36 and HIDC section 57, must also be powered in order to perform the logic and control functions required of the disk drive when locating the data.

However, most of the time during the operation of host computer 84 there is no need to read or write data to or from the disk drive. During these times, one method of suspending operation of the disk drive is to use suspend button 87 to power down non-essential disk drive functions including HDA 10. Alternatively, host computer 84 may include hardware and/or software which automatically suspends disk drive operation after a specified period of inactivity.

In another method of conserving electrical power, each of the electrical components illustrated in FIG. 1 may be selectively placed in an inactive or reduced power state by microcontroller 36. For example, a disable/enable command may be provided for each device, or for a functional group of devices. Additionally, for digital devices, the clock signals provided to the device or, to functional circuit blocks within the device, may be inhibited to reduce the power consumption. Alternatively, the power supply to each device may simply be interrupted, again under the control of the microcontroller 36.

In the present invention, another method of conserving power is provided in which microcontroller 36 and spindle motor driver 14 provide multiple driving modes to spindle motor 16. More particularly, unipolar, bipolar or tripolar modes are selected by microcontroller 36 as a function of the operating phase (e.g. startup or running) and the torque requirements of spindle motor 16 when operating in that phase. For example, the bipolar or tripolar mode is typically used during startup to provide the stall torque needed to overcome the stiction, bearing and cogging forces. Initial acceleration would occur in the bipolar mode. The unipolar mode is then optionally selected at a point during acceleration, and operation in the bipolar or unipolar mode is employed to reach the operating velocity and continues during the running phase. As detailed later, the adaptive use of either the bipolar or unipolar run mode is selected based upon minimal power consumption.

Figure 2:
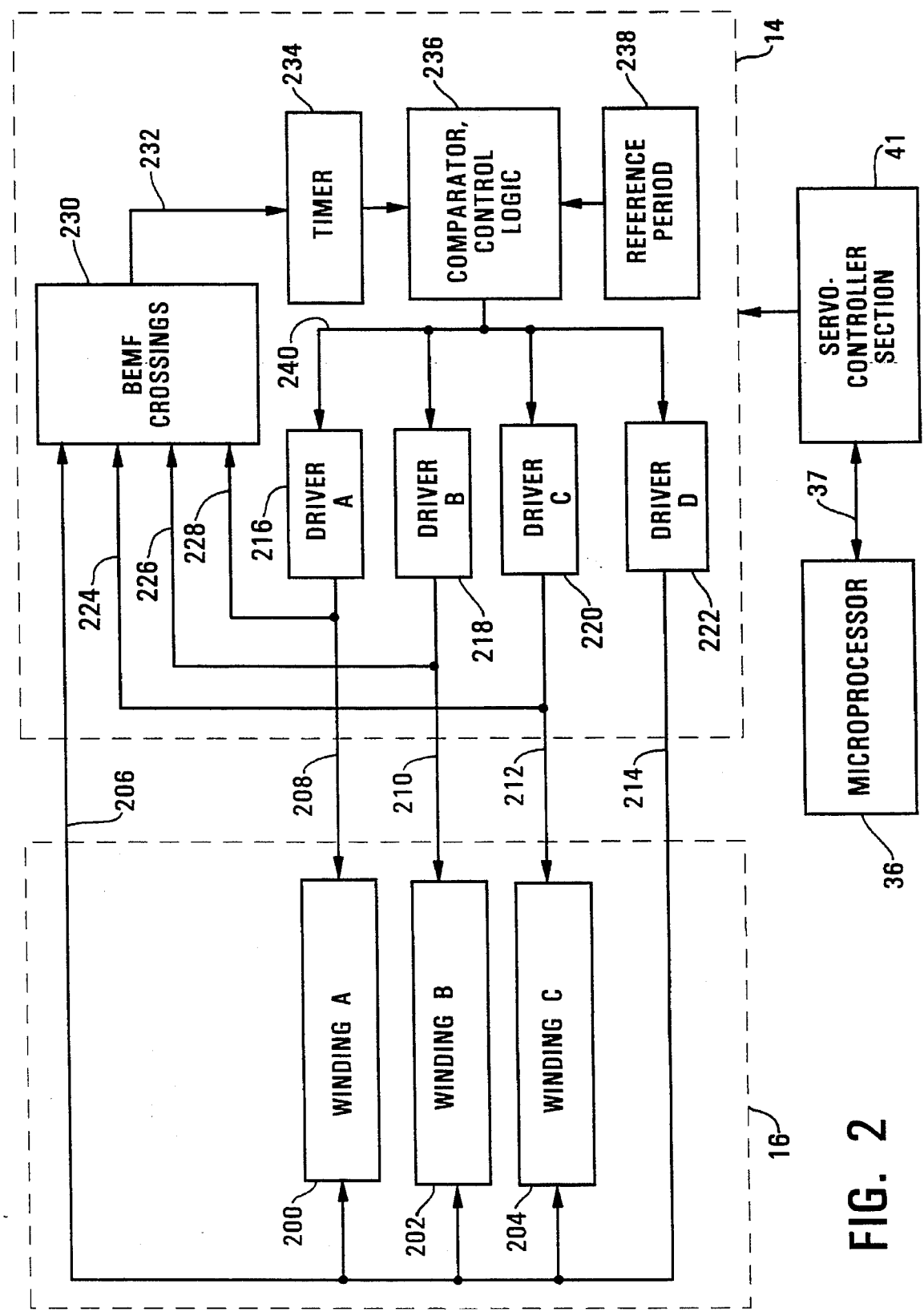
FIG. 2 is a functional block diagram illustrating the spindle motor windings and spindle motor driver control modules of the disk drive system of FIG. 1.

Referring to FIG. 2, the windings of spindle motor 16 and the associated driver and control modules of spindle motor driver 14 are now discussed. As shown in FIG. 2, spindle motor 16 includes windings 200, 202, and 204 each of which has one terminal connected respectively to motor drivers 216, 218, and 220 via signal paths 208, 210, 212. In addition, the other terminals of windings 200, 202, 204 are commonly connected to a motor driver 222 via a signal path 214. Each of motor drivers 216, 218, 220, 222 of spindle motor driver 14 includes a pair of devices, typically field-effect transistors ("FETs"), which provide the necessary drive current to power its respective winding in order to generate the torque needed to rotate the rotor of spindle motor 16.

Spindle motor driver 14 also includes a back-EMF ("BEMF") crossings sense module 230 which is commonly connected to windings 200, 202, 204 via a signal path 206. Sense module 230 monitors the back-EMF generated by windings 200, 202, 204 during rotation using one of several conventionally known methods. For example, sense module 230 may detect when the sign of the back-EMF of the winding that is not being driven changes from positive to negative or vice-versa. When the sign changes, sense module 230 sends a reset/start signal to a timer module 234 via a signal path 232. The output of timer module 234 is connected to a comparator/control logic module 236. The output of a reference period module 238 is also connected to comparator/control logic module 236.

As will be appreciated by those skilled in the art, the efficiency factor ("$K_M$") of spindle motor 16 is related to the physical size of the motor and is proportional to the torque squared divided by the power. The torque, in turn, is proportional to the driving current of windings 200, 202, 204. Since the power is proportional to the current squared, the $K_M$ is a constant for a given physical configuration of spindle motor 16. The $K_M$ is also proportional to the back EMF (electro-motive force) constant or ("voltage constant" or "$K_E$") squared divided by the winding resistance ("$R_W$"). $R_W$, in turn, depends upon the wire gage and number of turns comprising windings 200, 202, 204 and thus can be selected during the design of windings 200, 202, 204.

As will further be appreciated, the voltage constant $K_E$ is related to the type of wire and number of turns comprising winding's 200, 202, 204. $K_E$ also depends on the number of windings being driven at a time, so that the value of $K_E$ for spindle motor 16 is reduced by switching from tripolar or bipolar to unipolar driving. Additionally, since only one winding is powered when using the unipolar mode, the back-EMF is reduced to a lower value as compared to the bipolar or tripolar driving modes.

The current drawn depends on the winding resistance $R_W$ and the series resistance $R_S$. More particularly, when starting spindle motor 16 using the tripolar mode, approximately 33 percent more current will be drawn than when starting the motor using the bipolar mode. Because Rwinding of a tripolar mode is 0.75 of a bipolar Rwinding. Similarly, when driving spindle motor 16 using the unipolar mode about 20 percent more current will be drawn than when running the spindle motor 16 using the bipolar mode. Thus, the peak power consumption can be reduced by selecting a set of $K_M$ and $K_E$ parameters and switching between drive modes. Whether or not the total power consumption from start to stop of the spindle is reduced depends on the ratio of start to "on target velocity" time to run time of the spindle.

During startup, sufficient power must be provided to spindle motor 16 to overcome inertial and frictional forces, such as stiction between magnetic disks 13 and read/write heads 12 which may be resting on the disk surface. Stated differently, in accordance with conventional Winchester disk drive technology, an initial surge of power is needed to break away stiction and accelerate the disk to fly read/write heads 12 above the disk surface. In the preferred embodiment, the bipolar mode is initially selected during startup of the disk drive. Spindle motor parameters ($K_e$, $K_m$) values are designed by utilizing statistical methods rather than worst case conditions. If the power provided by the bipolar mode is insufficient to start the disk drive, then increased power is applied by selecting the tripolar mode. Thus, this method of mode switching from bipolar to tripolar (whenever it is needed) results in peak power savings or a smaller size motor (smaller $K_m$).

Once magnetic disks 13 are rotating and read/write heads 12 are flying, the driving mode is switched from bipolar to unipolar. This switching occurs at a fixed percentage of the target velocity or adaptively when the acceleration of the magnetic disks 13 has dropped below a predetermined value. In a preferred embodiment of the present invention the acceleration of the magnetic disks 13 during bipolar driving is monitored and the mode is switched to unipolar driving when the acceleration has dropped below the predetermined value. Since the acceleration of the magnetic disks 13 may vary, e.g. with the battery voltage, the switching point will automatically adapt, e.g. with the strength of the battery.

The unipolar mode reduces the effective $R_w$ of spindle motor 16 by one half by using one half of the bipolar winding. Thus, the back-EMF is reduced and higher velocities can be reached. However, the unipolar mode uses about 20 percent more current so, as mentioned above, the total power consumption will be reduced only if current times time (i.e. the integral of current with respect to time) in a bipolar start/bipolar run is greater than current times time in a bipolar start/unipolar run condition. When the unipolar run mode is combined with the bipolar or tripolar start modes in this manner, a large reduction in peak starting current can be realized.

Figure 3:
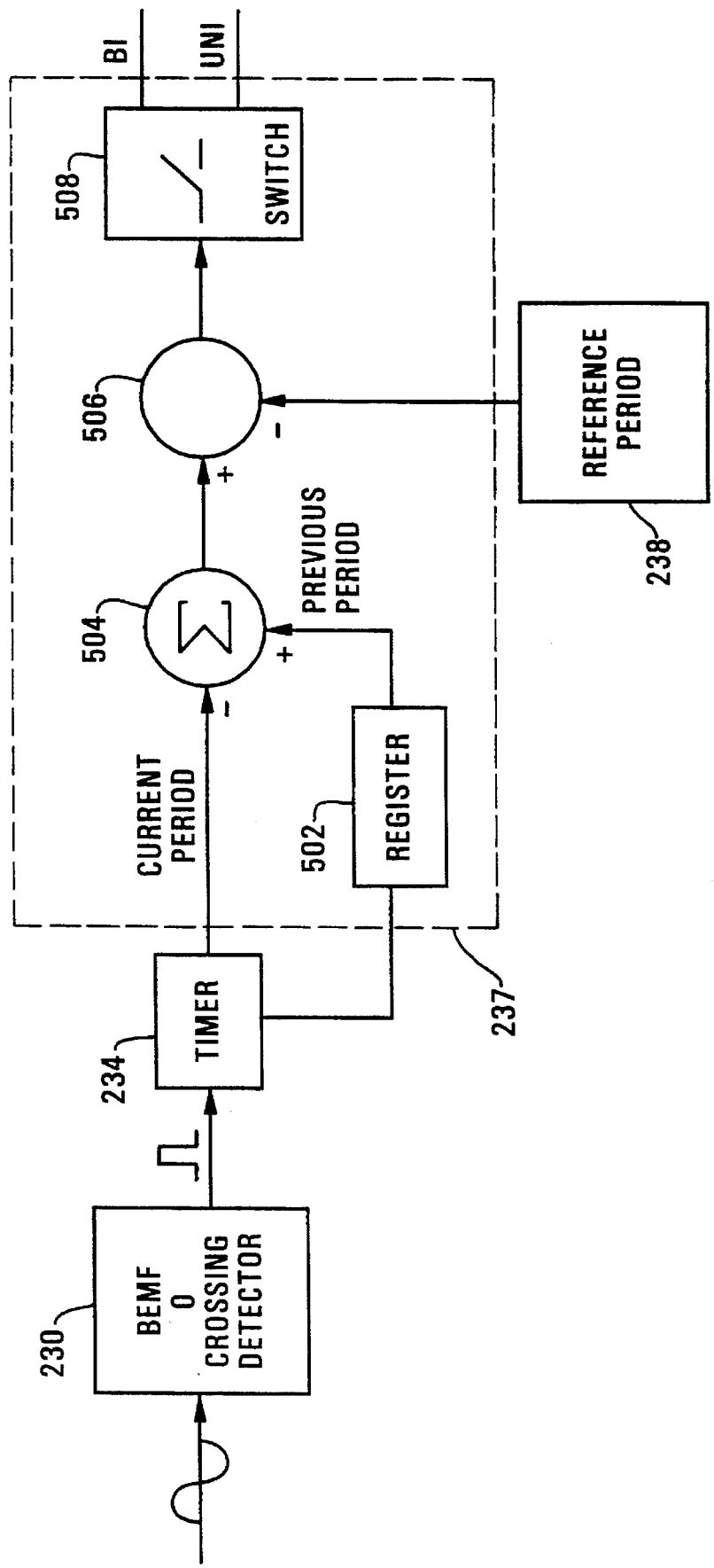
FIG. 3 is a functional block diagram of the comparator/control logic of the present invention.

Referring to FIG. 3, a block diagram of the adaptive mode switching circuitry is illustrated. The switching circuitry is included in logic module 236 and compares the outputs of timer module 234 and reference module 238 to adaptively select between bipolar to unipolar driving. More particularly, in the preferred embodiment switching circuitry 237 includes a data register 502, a subtractor 504, a comparator 506 and switching logic 508. Crossing detector 230 monitors the back EMF zero-crossings of the windings 200, 202, 204 and generates a pulse for each detected zero-crossing. Timer 234 accumulates the clock pulses until the next back EMF crossing pulse comes and the total number of clock pulses is sent both to data register 502 and subtractor 504. Data register 502 delays its content for one back EMF crossing pulse so that the total number of pulses for the current period is subtracted from the previous period (by substractor 504). The difference output of substractor 504 is sent to comparator 506 where the difference is compared with a reference count provided by reference period register 238.

The reference count provided by reference period register 238 is predetermined for each spindle motor to minimize total current drawn during motor spin up. The optimal acceleration (reference count) for switching from bipolar start to unipolar run to achieve this current minimization may be iteratively determined as follows. Initial parameters are set which include the motor voltage, the target velocity, the start and run torque, the average voltage constant, and an initial reference count (i.e. estimated predetermined switching acceleration). Once the parameters are set, the instantaneous current and instantaneous acceleration are found for the first mode (i.e. bipolar) for a delta time (i.e. a small simulation period). During each iteration, current consumed is added to a "total current" value. The process is continued iteratively until the predetermined acceleration is reached (i.e., as long as the difference output of subtractor 504 exceeds the reference count of period generator 238). When the difference output drops below the reference count, (which indicates that acceleration has dropped below the predetermined amount) the driving mode switches from bipolar to unipolar. At this point velocity is saved to become the initial velocity of the second mode (i.e. unipolar). The total current accumulated during the bipolar start mode is also saved.

The above steps are repeated for the unipolar run mode until the target velocity is reached. When the target velocity is reached, the total current for the unipolar run mode is added to the total current for the bipolar start mode and saved. Another reference count (acceleration) is then selected and the above steps are repeated until the reference count (acceleration) having the lowest combined (start+run time) total current has been found.

Figure 4:
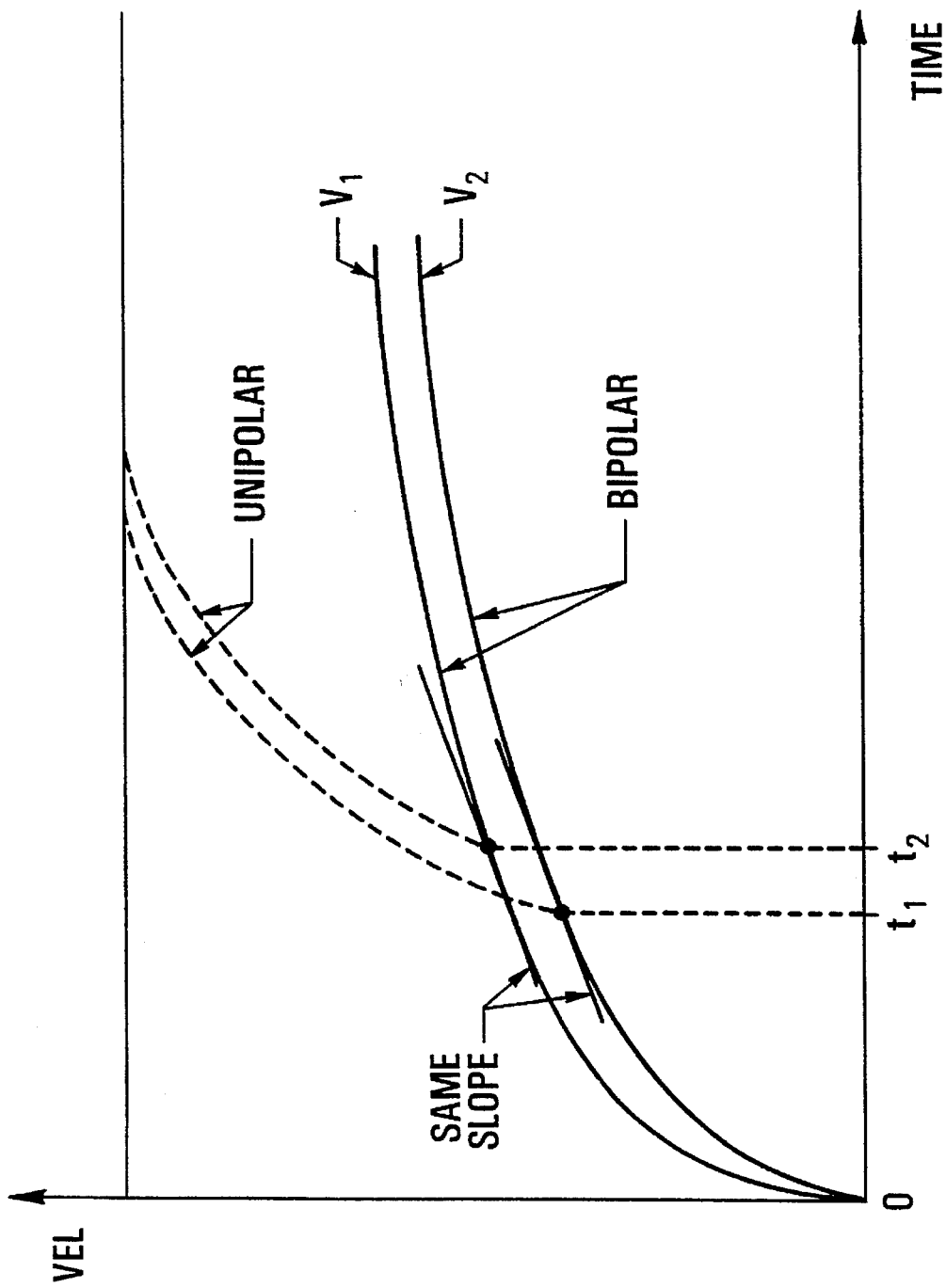
FIG. 4 is a graph which plots the velocity versus time curves for the unipolar and bipolar driving modes for two battery voltages.

FIG. 4 illustrates the advantage of the adaptive switching provided by the present invention. In FIG. 4, the velocity versus time curves for bipolar starting mode is shown for two different drive voltages which could result because of unregulated battery voltage levels, along with the target velocity for unipolar driving. Bipolar start curves are vertically separated by an amount determined by the difference in battery voltage. For time values close to zero, the slope of the bipolar curves depend on the drive voltage level while for longer times, the slope becomes essentially independent of voltage level. Since the slope of each curve represents the acceleration of magnetic disks 13, the optimal switching point from bipolar to unipolar driving will vary depending on the drive voltage. For example, the drive voltage may vary due to battery voltage variations which can be automatically compensated for by the adaptive mode switching of the present invention.

Figure 5:
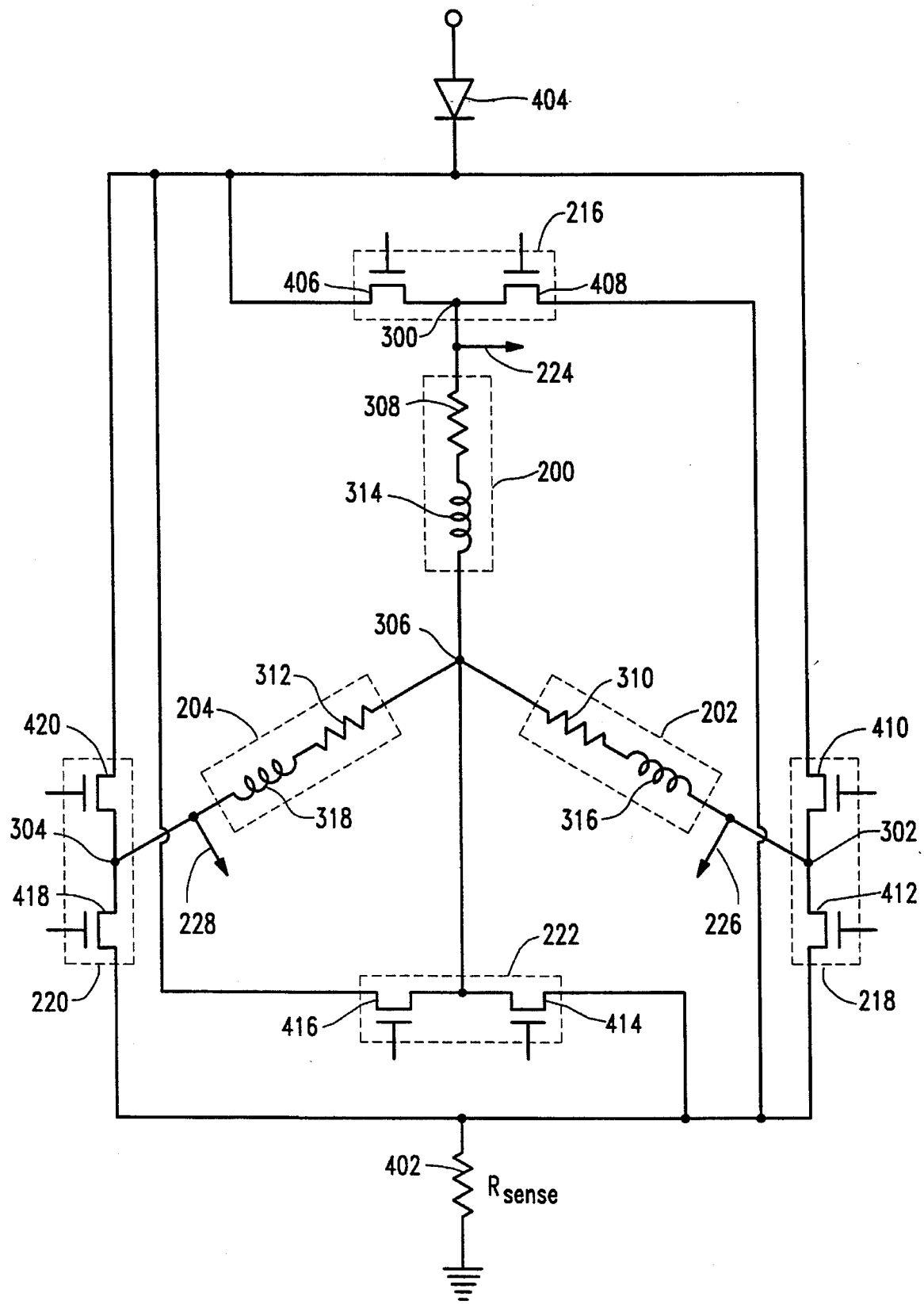
FIG. 5 is a schematic diagram illustrating the spindle motor windings and spindle motor drivers of the present invention.

Referring now to FIG. 5, the connections between motor drivers 216, 218, 220, 22 and windings 200, 202, 204, along with their operations, are shown. Each of motor drivers 216, 218, 220, 222 consists of a pair of field-effect transistors (FETs) 406, 408, 410, 412, 414, 416, 418, 420 which are connected in series, with the source of one FET connect to the drain of the other FET. The unconnected source of each pair of FETs is connected to a positive voltage while the unconnected drain is connected to a relatively negative voltage. Terminals 300, 302, 304 and 306 of windings 200 are connected to their respective motor drivers 216, 218, 220, 222 at a point between the series connected source and drain of each pair of FETs.

Also shown in FIG. 5 are schematic diagrams of windings 200, 202, 204 of spindle motor 16. Each of windings 200, 202, 204 consists of a number of turns of wire having a corresponding resistance 308, 310, 312 and inductance 314, 316, 318. Resistances 308, 310, 312 determine the amount of direct current which will flow through their respective winding, while inductances 314, 316, 318 generate the back-EMF that is monitored by sense module 230. The back-EMF generated voltages are monitored at points 224, 226, 228 shown in FIG. 5.

As mentioned above, the torque produced by spindle motor 16 is proportional to the amount of current driving the windings 200, 202, 204. However, the torque produced by each winding is not a constant, but instead varies according to the rotational position of the winding. Stated differently, the torque varies according to the positions of the winding stators relative to the permanent magnets. Minimum torque is produced when the energized winding stators are aligned with the permanent magnets, while maximum torque is produced when the windings are halfway between the permanent magnets.

The total torque produced does not always change linearly with the number of windings being driven, but also depends on the driving mode. For example, when spindle motor 16 is driven by the tripolar mode it requires approximately 33 percent more current than the bipolar mode, but produces only about 16 percent more torque. However, when spindle motor 16 is switched from the bipolar to the unipolar mode it consumes about 20 percent more current compared to a motor designed to start and run only in the bipolar mode while producing the same amount of torque.

Figure 6:
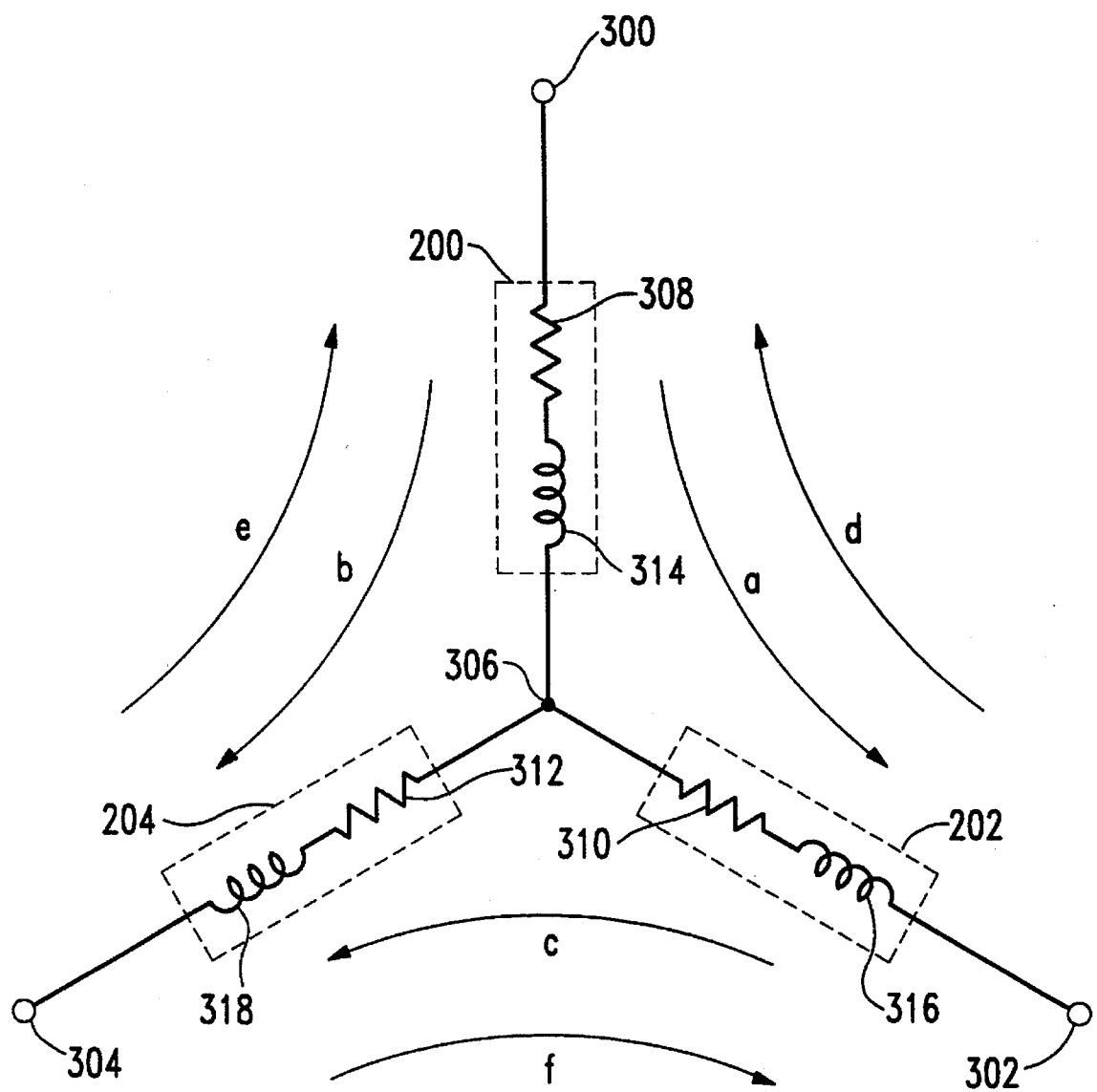
FIG. 6 is a schematic diagram illustrating the directions of current flow in the spindle motor windings when using tripolar or bipolar driving modes.

In FIG. 6 the six directions (e.g. a–f) in which the current may flow through windings 200, 202, 204 when driving in the bipolar or tripolar mode are shown. When driving spindle motor 16 using the tripolar mode, two of the six current directions are simultaneously driven resulting in all three of windings 200, 202, 204 being powered. However, when driving spindle motor 16 using the bipolar mode, only one current direction is driven at a time resulting in two of windings 200–204 being simultaneously powered. As will be discussed in more detail later, the directions of current flow are switched by motor drivers 216, 218, 220 and 222 under the control of comparator/control logic module 236.

FIG. 7 is a table illustrating the functional logic applied to terminals 300, 302 and 304 for generating the six operating phases AB through FA during tripolar driving. Note that each operating phase results from current flowing through all three of windings 200, 202, 204. Thus, for tripolar mode all three windings are simultaneously driven such that, at any time, two terminals have one polarity and the other terminal has the opposite polarity. Note also that changing from one phase to the next only requires switching one terminal from high to low or low to high.

Continuing with FIG. 8, a table which similarly illustrates the functional logic applied to terminals 300, 302, 304 for generating the six operating phases A through F during bipolar driving is provided. For bipolar driving two of windings 200, 202 and 204 are simultaneously driven with the third winding not driven (e.g. both FETs for the corresponding driver are turned off). As with tripolar driving, phase changes can be made by switching only one of terminals 300, 302 and 304 at a time.

Figure 9:
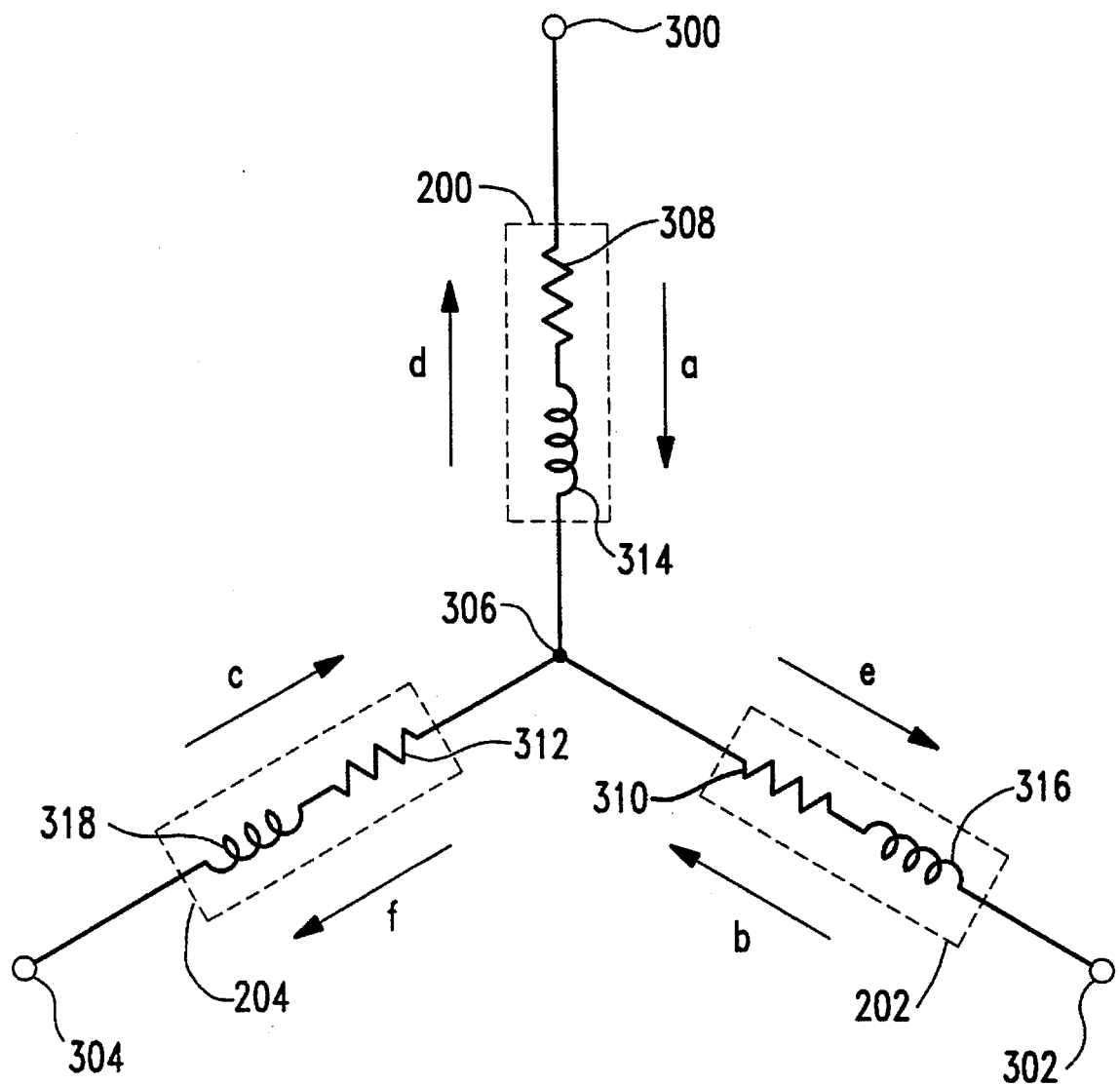
FIG. 9 is a schematic diagram illustrating the directions of current flow in the spindle motor windings when using the unipolar driving mode.

Referring to FIG. 9, the six directions (a, b, c, d, e, f) in which the current may flow through windings 200, 202, 204 when driving in the unipolar mode are shown. When driving spindle motor 16 using the unipolar mode only one of windings 200, 202, 204 is driven at a time. This requires that center terminal 306 be used in combination with one of terminals 300, 302, 304 at a time.

Continuing with FIGS. 10(*a*)–10(*c*), tables which illustrate the functional logic applied to terminals 300, 302, 304, 306 for generating the drive phases during unipolar driving are provided. Note that for unipolar driving, there are three methods of driving windings 200, 202, 204. The first method (FIG. 10(*a*)) is to set center terminal 306 low and then alternatively switch each of terminals 300, 302, 304 from low to high. The second method (FIG. 10(*b*)) is to set center terminal 306 high and then to alternatively switch each of terminals 300, 302, 304 from high to low. The first method will produce three drive phases corresponding to current directions a, b and c, while the second method will produce three drive phases corresponding to current directions d, e and f.

A six-phase unipolar drive method can also be formed by combining the first and second methods (FIG. 10(c)). Specifically, this method involves toggling center terminal 306 between low and high while alternatively switching terminals 300304 from low to high. The six-phase unipolar drive method will produce drive phases corresponding to current directions a, f, b, d, c and e while powering only one of windings 200, 202, 204 at a time.

Referring again to FIGS. 1, 2, 3 and 5, the operation of the disk drive of the present invention is now described in relation to the specific motor driving circuitry of the illustrated preferred embodiment. When data which is stored on one of magnetic disks 13 is to be retrieved, spindle motor 16 is started using the bipolar mode. This is accomplished by turning on one of FETs 406, 410 or 420 which connects one of windings 200, 202, 204 to the high voltage, and also turning on another FET (not associated with the previously selected FET) 408, 412 or 418 which connects another winding 200, 202, 204 to the low voltage. Note that the two FETs which are turned on are from two different of motor drivers 216, 218, 220. When two of the FETs are turned on as indicated, current flows through two of windings 200, 202, 204 and produces torque. As the shaft of spindle motor 16 rotates, pairs of FETs are turned on and off to maintain a current flow through two of windings 200, 202, 204, thus producing an acceleration of magnetic disks 13.

In the event that a bipolar mode does not overcome stiction, then the tripolar mode is to be asserted. This is accomplished by turning on one of FETs 406, 410 or 420 which connects one of windings 200, 202, 204 to high, and also turning on two of FETs (not associated with any previously selected FET) 408, 412 or 418 which connects the other two windings to low. Note that the three FETs which are turned on at any one time are from three different motor drivers 216, 218, 220. When three of the FETs are turned on as indicated, current flows through all three of windings 200, 202, 204 and produces increased torque. As the shaft of spindle motor 16 rotates, the FETs are turned on and off in a time and position dependent sequence to maintain a current flow through the three windings, thus producing a positive torque to accelerate the spindle motor 16.

When the acceleration of spindle motor 16 has dropped below the predetermined value, the drive mode is switched from bipolar or tripolar to unipolar. Specifically, one of the FETs in motor driver 222 is turned on by comparator/control logic module 236 along with one of the FETs of one of motor drivers 216, 218, 220. This causes current to flow through one of windings 200, 202, 204 and the process is repeated for each of motor drivers 216, 218, 220. Spindle motor 16 and attached magnetic disks 13 continue to accelerate in the unipolar mode to the target rotational velocity. Note that maximum rotational speed for unipolar driving is higher than for bipolar driving if motor is designed for bipolar start/unipolar run. Once the desired data has been retrieved, the disk drive may be powered down until more data is to be accessed.

The efficiency factors as functions of the design parameters are derived for spindle motor 16 for the cases of bipolar start, bipolar run, tripolar start and unipolar run. (Definitions for the design parameters used in the derivations are summarized in Appendix A.) First of all, in order for spindle motor 16 to begin rotating during bipolar start, the motor torque must exceed the stall torque:

$$T_M > T_S \qquad (1)$$

where the stall torque can be further written to include the stiction torque, cogging torque, and bearing torque $$T_S = T_{st} + T_C + T_B \qquad (2)$$

and the motor torque is proportional to the bipolar start current $$T_M = K_{Tminh} I_S \qquad (3)$$

The constant of proportionality depends on the minimum motor torque constant and the temperature factor for a heated winding $$K_{Tminh} = (K_{Tmin}) K_{Ph} \qquad (4)$$

The heated temperature factor can be expressed as $$K_{Ph} = (1 + \Delta T_1 \gamma_m) \qquad (5)$$

with the temperature difference between the heated winding and the ambient temperature given by $$\Delta T_1 = T_{Ah} - T_{ROOM} \qquad (6)$$

The bipolar start current is proportional to the motor voltage divided by the series resistance ($R_S$) and the bipolar heated winding resistance ($R_{Wh}$)

$$I_S = \frac{V_M}{R_S + R_{Wh}} \qquad (7)$$

where the motor voltage is the difference between the supply voltage and any fixed voltage drops $$V_M = V_S - V_{Fd} \qquad (8)$$

The series resistance is the sum of the sense resistance, the diode resistance and two FET resistances $$R_S = R_{Sen} + R_D + 2R_F \qquad (9)$$

and the bipolar heated winding resistance is the product of the winding resistance and the heated winding resistance temperature factor $$R_{Wh} = R_W T_{Fh} \qquad (10)$$

with the latter given by $$T_{Fh} = (1 + \Delta T_1 \gamma_C + P \theta \gamma_C) \qquad (11)$$

The power dissipation of the bipolar winding for the spindle motor 16 is given by $$P = I_W^2 R_{Wh} \qquad (12)$$

The torque constant is related to the motor back EMF constant (in English units) by $$K_T = 1.35 K_E \qquad (13)$$

Additionally, the minimum motor back EMF, the heated motor back EMF and the bipolar motor constant are respectively given by $$K_{Emin} = K_{Emin2pk} K_{Epk} \qquad (14)$$

$$K_{Epkh} = (K_{Fh}) K_{Epk} \qquad (15)$$

$$K_M = \frac{K_T^2}{R_W} \quad (16)$$

Substituting these into the bipolar start condition of equation (1) leads to $$\frac{1.35 \, K_{Emin2pk} \, K_{Epk} \, K_{Fh} \, V_M \, K_M}{R_S + K_M + 1.82 \, K_{Epk}^2 \, T_{Fh}} > T_S \quad (17)$$

Solving for the bipolar start motor constant gives $$K_{M(start,bi)} > \frac{-1.82 \, T_S \, K_{Epk}^2 \, T_{Fh}}{T_S R_S - K_{Epk} K_{Fh} V_M \, 1.35 \, K_{Emn2pk}} \quad (18)$$

This is the condition required to start spindle motor 16 using the bipolar mode.

For the bipolar run condition, the applied motor voltage must exceed the cold motor back EMF constant multiplied by the motor rotational velocity $$V_M > K_{Epkc} \omega \quad \text{(Run Condition)} \quad (19)$$

The motor voltage may be expressed as the sum of three terms: the series resistance times the run current, the heated winding resistance times the run current, and the fixed voltage drops $$V_M = I_R R_S + I_R R_{Wh} + V_{Fd} \quad (20)$$

while the cold motor back EMF constant is the product of the peak motor back EMF voltage and the temperature factor for the cold motor back EMF constant $$K_{Epkc} = K_{Epk} K_{Fc} \quad (21)$$

The temperature factor for the cold motor back EMF constant is further related to the difference between the cold and ambient temperatures by $$K_{Fc} = (1 + \Delta T_2 \gamma_C) \quad (22)$$

where $$\Delta T_2 = T_{Ac} - T_{ROOM} \quad (23)$$

The run current for spindle motor 16 is given by $$I_R = \frac{T_R}{K_{Tav}} \quad (24)$$

where the average value of the torque constant is proportional to the peak torque constant $$K_{Tav} = K_{Tav2pk} K_{Tpk} \quad (25)$$

The bipolar cold resistance is given by the room temperature winding resistance ($R_W$) multiplied by the cold winding resistance temperature factor ($T_{Fc}$), i.e.:

$$R_{Wc} = T_{Fc} R_W \quad (26)$$

the latter further being given by $$T_{Fc} = (1 + \Delta T_2 \gamma_C + P \theta \gamma_C) \quad (27)$$

The cold average value of the torque constant is proportional to the average value of the torque constant multiplied by the cold winding resistance temperature factor $$K_{Tavc} = K_{Tav} T_{Fc} \quad (28)$$

Substituting these into the run condition equation results in the following expression for the motor constant for bipolar run:

$$K_{M(run,bl)} > \frac{1.82 \, K_{Epk}^2 \, T_R \, T_F}{1.35 \, V_M \, K_{Eav2pk} \, K_{Fc} \, K_{Epk} - T_R R_S - 1.35 \, K_{Eav2pk} \cdot \omega \cdot K f_C^2 \, K_{Epk}^2} \quad (29)$$

The tripolar start condition is now derived, based on the observation that the tripolar motor torque must be greater than the stall torque $$T_M{}' > T_S \quad (30)$$

The tripolar motor torque is proportional to the heated minimum tripolar motor torque constant multiplied by the tripolar start current $$T_M{}' = K_{T_{Minh}}{}' I_S{}' \quad (31)$$

where the start current is given by the motor voltage divided by the sum of the tripolar series resistance and the heated tripolar winding resistance $$I_S{}' = \frac{V_M}{R_{Stri} + R_{Wh}{}'} \quad (32)$$

The tripolar series resistance is given by the sum of the sense resistance, the diode resistance, and 1.5 times the FET resistance $$R_{Stri} = R_{Sen} + R_d + 1.5 R_F \quad (33)$$

while the heated tripolar winding resistance is given by the tripolar room temperature winding resistance scaled by the heated winding resistance temperature factor $$R_{Wh}{}' = R_W{}' T_{Fh} \quad (34)$$

The tripolar room temperature winding resistance is further defined to be 0.75 times the bipolar winding resistance $$R_W{}' = 0.75 R_W \quad (35)$$

The tripolar torque constant for a sinusoidal back EMF waveshape is defined to be approximately 0.866 times the bipolar torque constant $$K_T{}' = 0.866 K_T \quad (36)$$

while the heated minimum tripolar motor torque constant is related to the minimum motor torque constant by the heated temperature factor $$K_{Tminh}{}' = K_{Tmin}{}' K_{Fh} \quad (37)$$

Substituting these into the tripolar start condition gives $$\frac{V_M K_M (1.35) \, K_{Emn2pk} \, (0.866 \, K_{Epk}) \, K_F}{R_{Stri} K_M + (1.35 K_{Epk})^2 T_{F_H} (0.75)} > T_S \quad (38)$$

which may be solved to obtain the tripolar motor constant $$K_{M(start,tri)} > \frac{1.37 T_S T_{Fh} K_{Epk}^2}{1.17 K_{Epk} K_{Fh} V_M K_{Emn2pk} - T_S R_{Stri}} \quad (39)$$

The unipolar run condition requires that the unipolar motor voltage is greater than the unipolar cold back EMF motor constant times the rotational frequency $$V_M{}'' > K_{Epkc}{}'' \cdot \omega \quad (40)$$

where the unipolar motor voltage is further given by $$V_M{}^u = V_S - V_D - I_R{}^u R_S - I_R{}^u R_{wc}{}^u \qquad (41)$$

and the unipolar cold back EMF motor constant by the product of the cold motor back EMF constant and the unipolar peak back EMF constant $$K_{Pkc}{}^u = K_{Fc} K_{Epk}{}^{up} \qquad (42)$$

The cold unipolar motor winding resistance is defined to be 0.5 times the cold bipolar motor winding resistance $$R_{wc}{}^u = 0.5 R_{wc} \qquad (43)$$

while the average value of the unipolar back EMF constant for a sinusoidal back EMF wave shape is related to the unipolar peak back EMF constant by $$K_{Eav} = 0.83 K_{Epk}{}^u \qquad (44)$$

The efficiency ratio is given by the average to peak back EMF voltage (of bipolar case) divided by 0.955

$$R_E = \frac{K_{Eav2pk}}{0.955} \qquad (45)$$

The unipolar motor run current is given by the unipolar run torque divided by the unipolar average motor torque constant $$I_R{}^u = \frac{T_R}{K_{TAV}{}^u} \qquad (46)$$

where the latter is further given in English units as 1.35 times the average value of the unipolar back EMF constant $$K_{Tav}{}^u = 1.35 K_{Eav}{}^u \qquad (47)$$

The peak unipolar back EMF motor constant is defined as 0.577 times the peak bipolar back EMF motor constant $$K_{Epk}{}^u = 0.577 K_{Epk} \qquad (48)$$

Where 0.577 is derived from the expression 0.5×1/(Cos 30)=0.577. The 0.5 factor is due to the fact that in unipolar mode only one of two winding branches are energized at a time, while 1/(Cos 30) represents the efficiency factor of each branch of the unipolar mode as compared to bipolar. Also:

$$R_{wc} = R_w R_{Fc} \qquad (49)$$

resulting, by substitution and simplification, in $$K_{M(run,uni)} > \frac{1.41 T_R T_{Fc} K_{Epk}^2}{V_M R_E K_{Epk} K_{Fc} - 1.54 T_R R_S - 0.577 R_E K_{Epk}^2 \omega K_{Fc}^2} \qquad (50)$$

Figure 11:
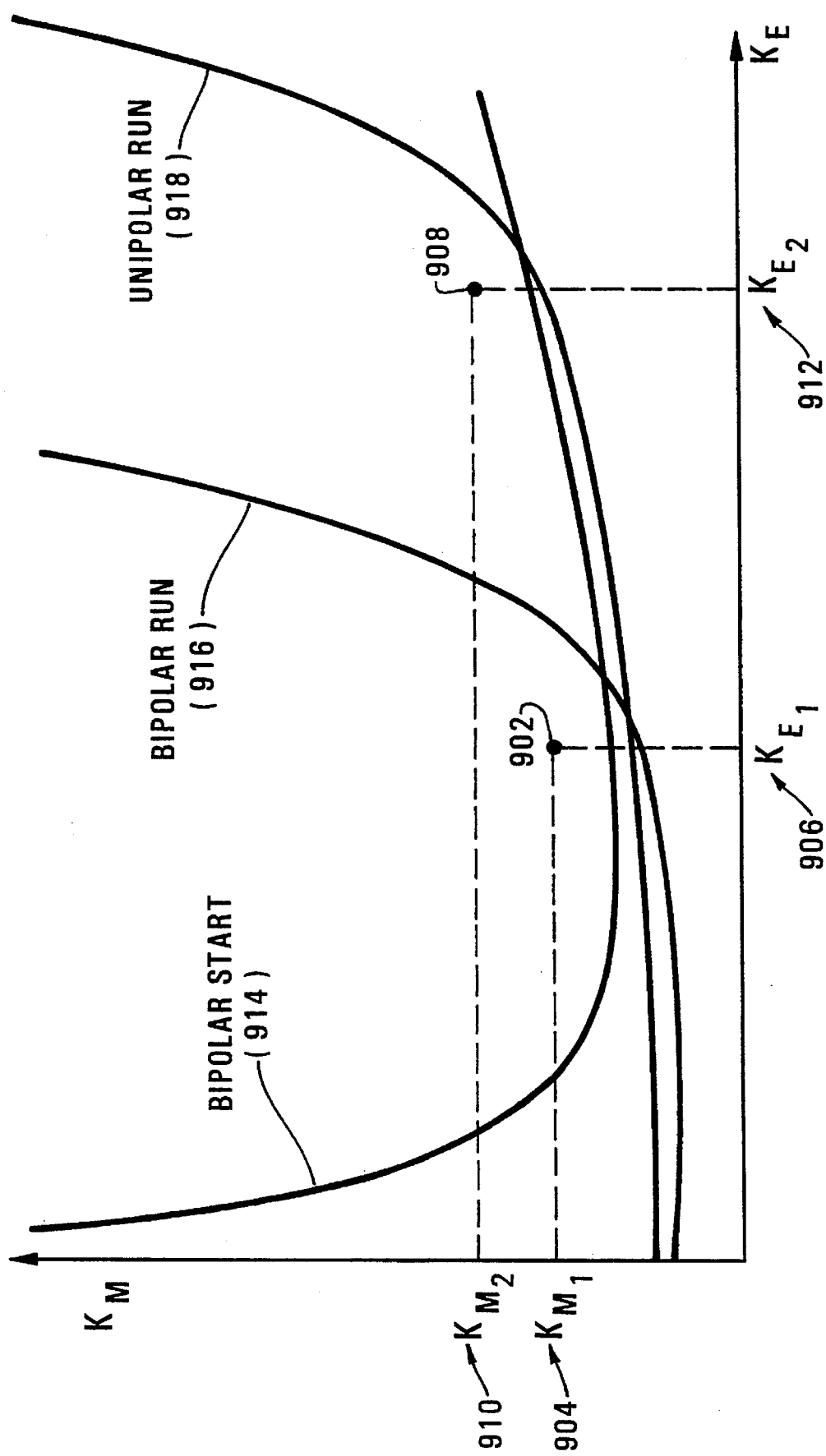
FIG. 11 is a graph which plot the $K_M$ versus $K_E$ values for bipolar start/bipolar run and for bipolar start/unipolar run.

FIG. 11 is a typical plot of the above derived $K_M$ versus $K_E$ for both bipolar start/run and bipolar start/unipolar run modes. Curve 914 is a plot of $K_M$ versus $K_E$ for a spindle motor during bipolar start and is given by (as per Eq. 18)

$$K_{M(start,bi)} > \frac{-1.82 T_S K_{Epk}^2 T_{Fh}}{T_S R_S - K_{Epk} K_{Fh} V_m 1.35 K_{Emn2pk}} \qquad (51)$$

while curve 916 is a typical plot of $K_M$ versus $K_E$ for the same spindle motor during bipolar run and is given by (as per Eq. 29)

$$K_{M(run,bi)} > \frac{1.82 K_{Epk2}^2 T_R T_F}{1.35 V_M K_{Eav2pk} K_{Fc} K_{Epk} - T_R R_S - 1.35 K_{Eav2pk} \cdot \omega \cdot K_{Fc}^2 K_{Epk}^2} \qquad (52)$$

The optimal values of $K_M$ and $K_E$ (i.e. 904, 906) for a bipolar start/run are located at point 902. Additionally, curve 918 is a plot for the same spindle motor during a unipolar run and is defined by (as per Eq. 50):

$$K_{M(run,uni)} > \frac{1.41 T_R T_{Fc} K_{Epk}^2}{V_M R_E K_{Epk} K_{Fc} - 1.54 T_R R_S - 0.577 R_E K_{Epk}^2 \omega K_{Fc}^2} \qquad (53)$$

with the optimal values of $K_M$ and $K_E$ (i.e. 910, 912) for a bipolar start/unipolar run located at point 908.

Note that the optimal values of $K_M$ and $K_E$ in the latter case are higher than those for the former. Since, most spindle motors are provided with bipolar type specifications (e.g. winding resistance and KE), the values of $K_M$ and $K_E$ shown at point 908 in FIG. 11 are based upon bipolar specifications. The actual $K_E$ value realized during the unipolar run is close to one half of the value given by point 912. Therefore, although the optimal bipolar $K_E$ value is somewhat larger in the bipolar start/unipolar run case than in the bipolar start/run case, during run time (unipolar mode) $K_E$ value is effectively smaller.

Figure 12:
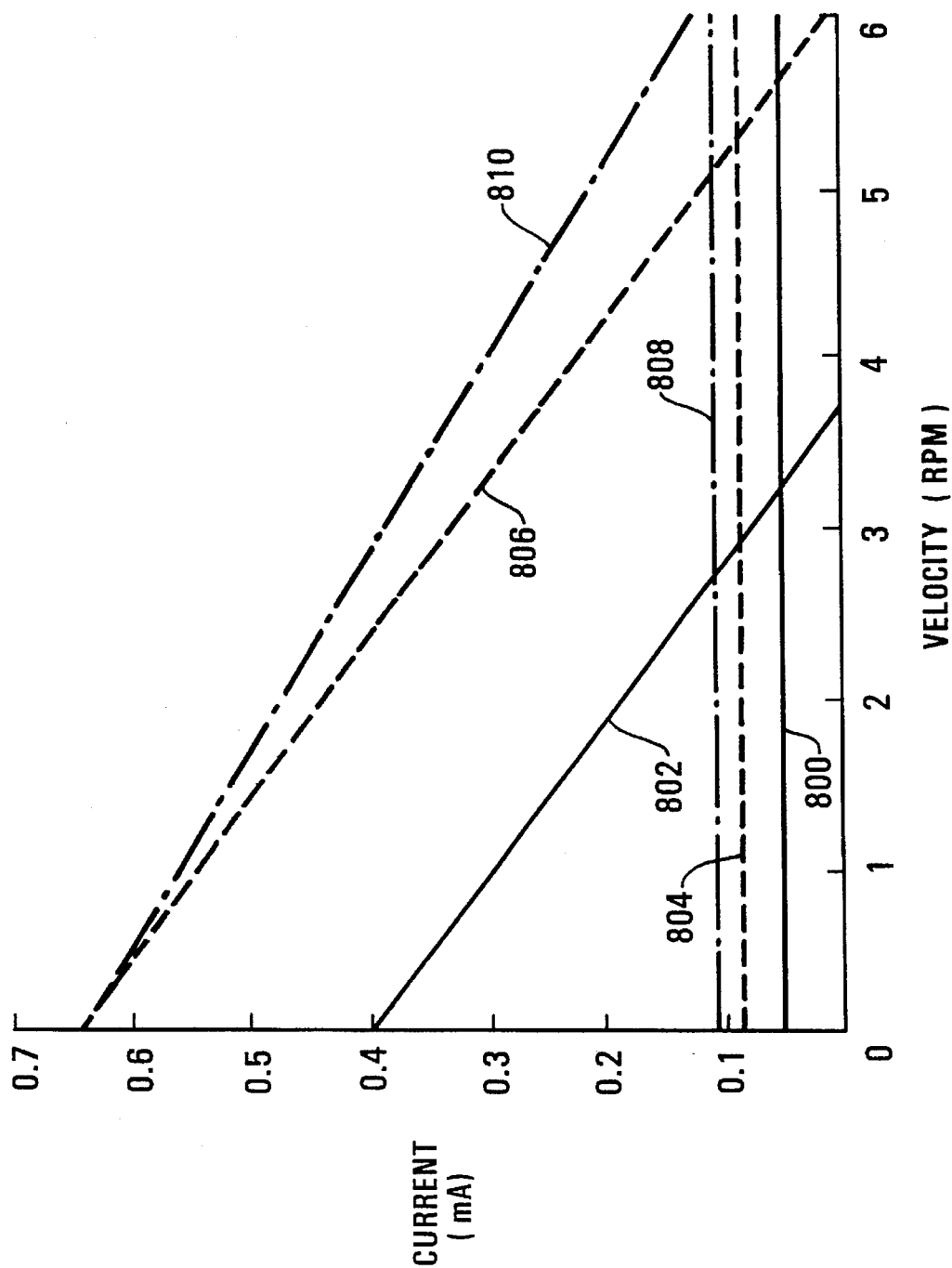
FIG. 12 is a graph which plots the start and run currents versus velocity for both bipolar start/run and bipolar start/unipolar run modes.

Referring to FIG. 12, the curves describing the bipolar and unipolar drive currents versus rotational velocity of magnetic disks 13 are shown. Curve 802 illustrates the bipolar start current and curve 800 illustrates the bipolar run current for a motor designed for bipolar start. The illustrated maximum attainable velocity is about 3,200 RPM. Similarly, curves 810 and 808 illustrate the unipolar start (accelerate) and unipolar run current for the motor designed for bipolar start/unipolar run. In this case the illustrated maximum attainable velocity is about 6,000 RPM, but substantially more current is required. Finally, curves 804 and 806 illustrate the bipolar start and bipolar run current for a motor designed for bipolar start/run. A substantial overall power savings can thus be realized by using the bipolar start/unipolar run modes of the present invention with a motor designed for bipolar start/unipolar run (i.e. curves 800 and 802 with curves 808 and 810).

Figure 13:
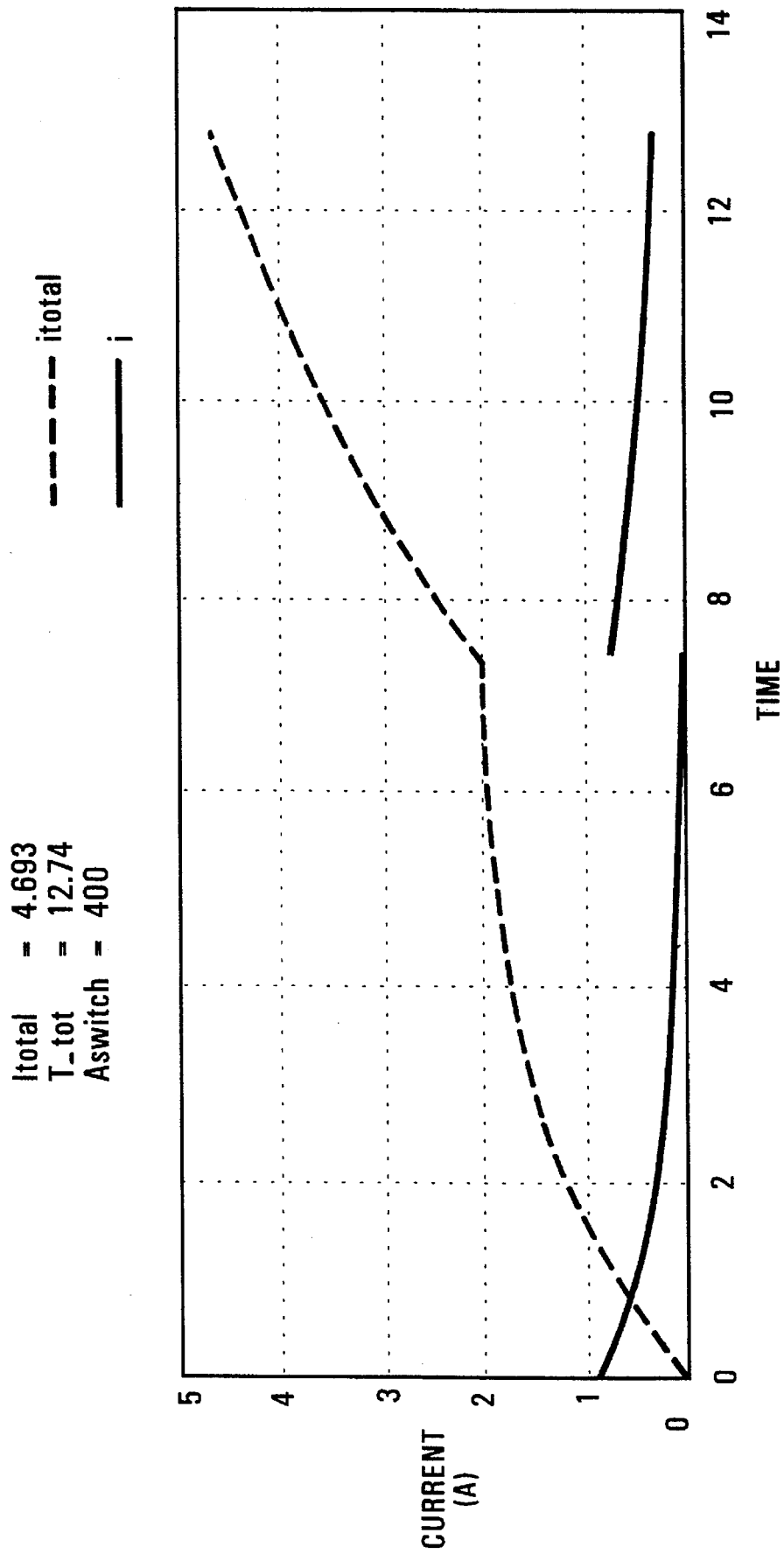
FIG. 13 is a graph which plots the current versus time for an acceleration based adaptive model switching.
Figure 14:
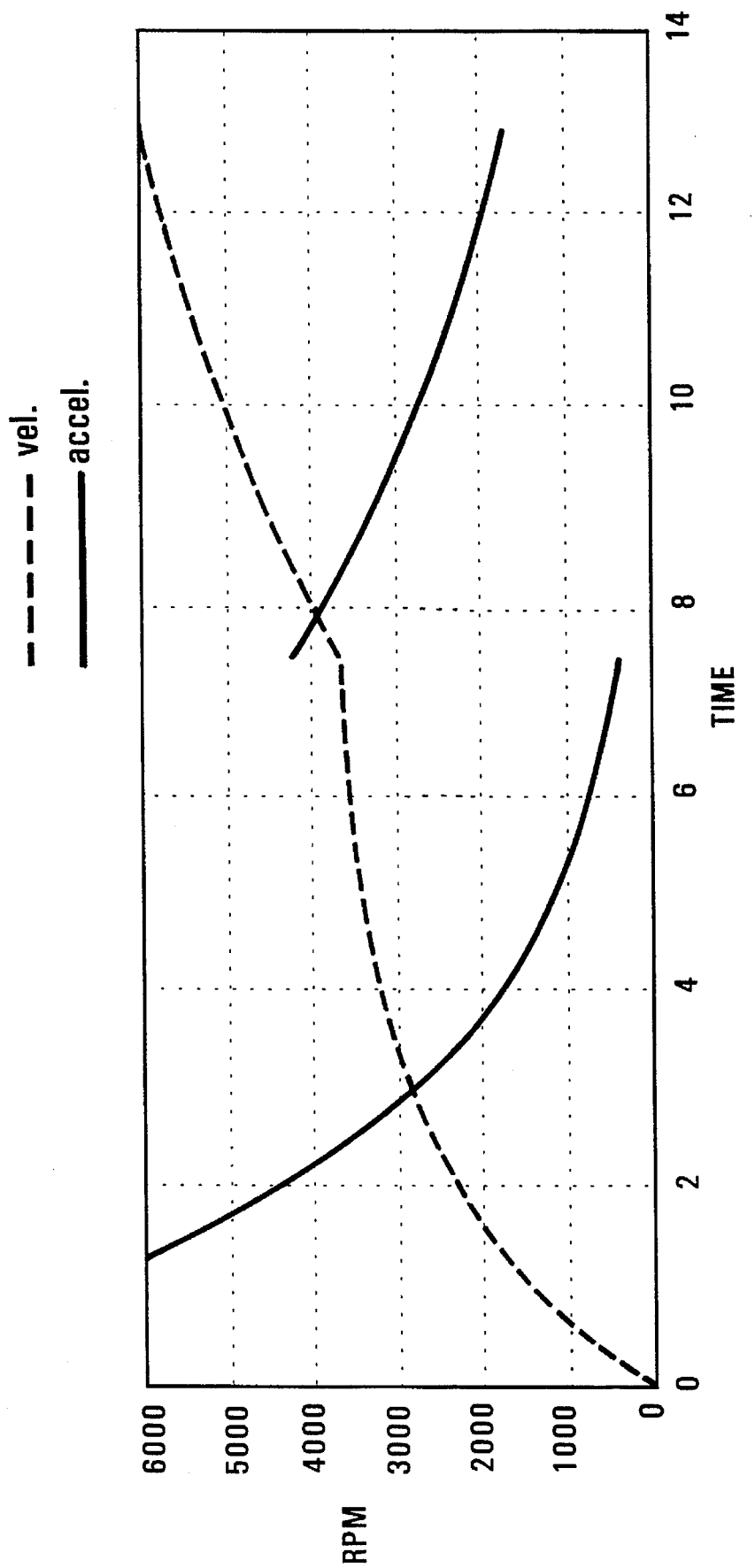
FIG. 14 is a graph which plots the acceleration and velocity versus time for an acceleration based adaptive model switching.
Figure 15:
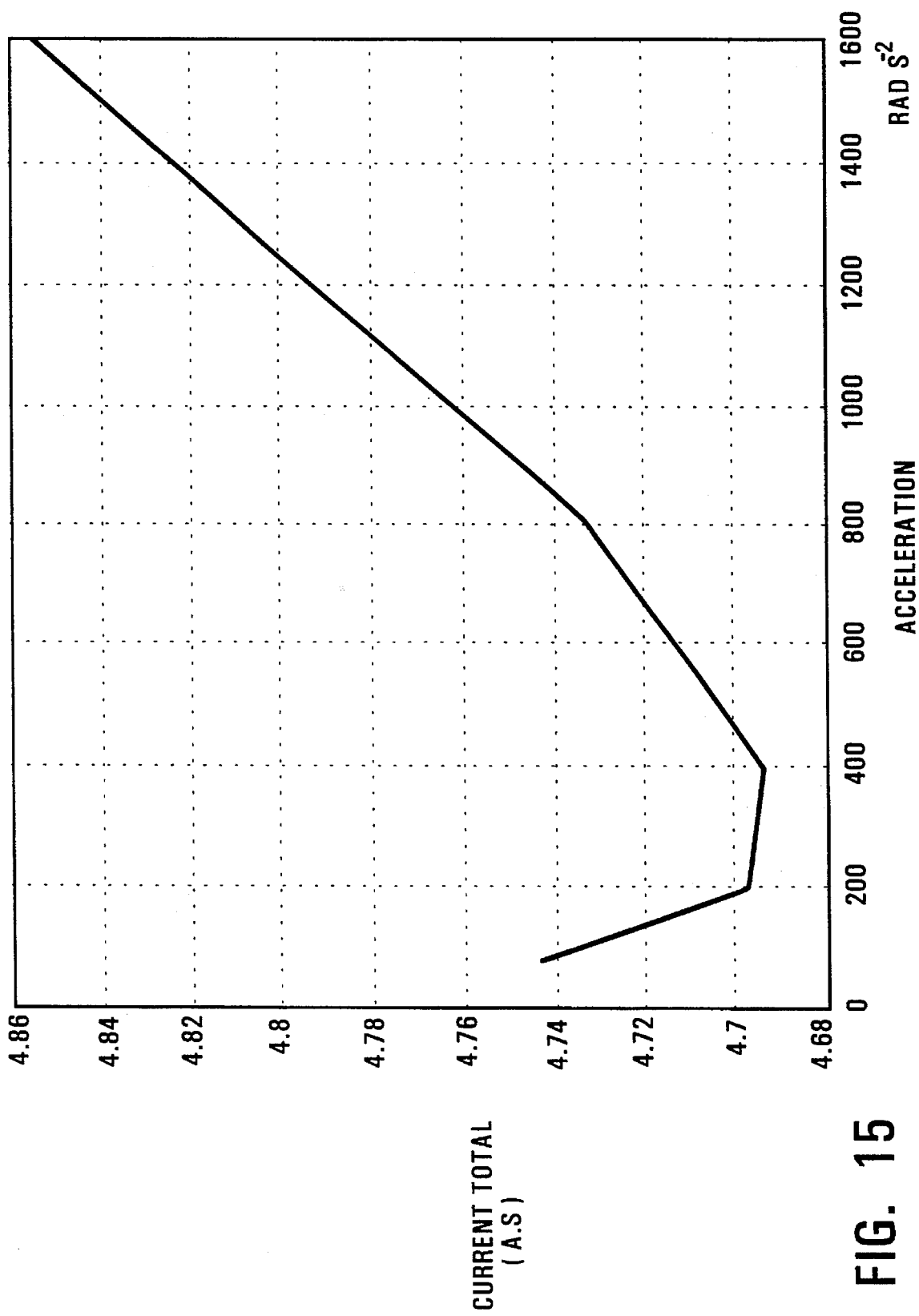
FIG. 15 is a graph which plots the total current versus acceleration switching value.

FIGS. 13, 14 and 15 illustrate the characteristics of adaptive mode switching based on an optimized acceleration switch value. In particular, FIG. 13 is a graph of instantaneous and total current versus time for bipolar start/unipolar run, where (for example) an acceleration switch value of 400 radians per second per second has been selected. This optimal switch value corresponds to a motor designed for optimal bipolar start/unipolar run as discussed in more detail below. FIG. 14, in turn, is a graph of the rotational velocity and acceleration curves corresponding to the acceleration switch value of FIG. 13. Note that the acceleration and start current have initially high values which rapidly decrease, while the velocity and total current increase in two steps which are connected at the switch point. Note also that the target velocity is much higher for unipolar driving than for bipolar driving.

FIG. 15 is a graph of the total current versus acceleration switch value. It may be seen that for the illustrated example an optimal acceleration switch over is at approximately 200–400 radians per second per second corresponding to the switch value of FIG. 13. Note that the total current drops substantially at the optimal switch point, then rapidly increases in a nearly linear manner with the acceleration.

Figure 16:
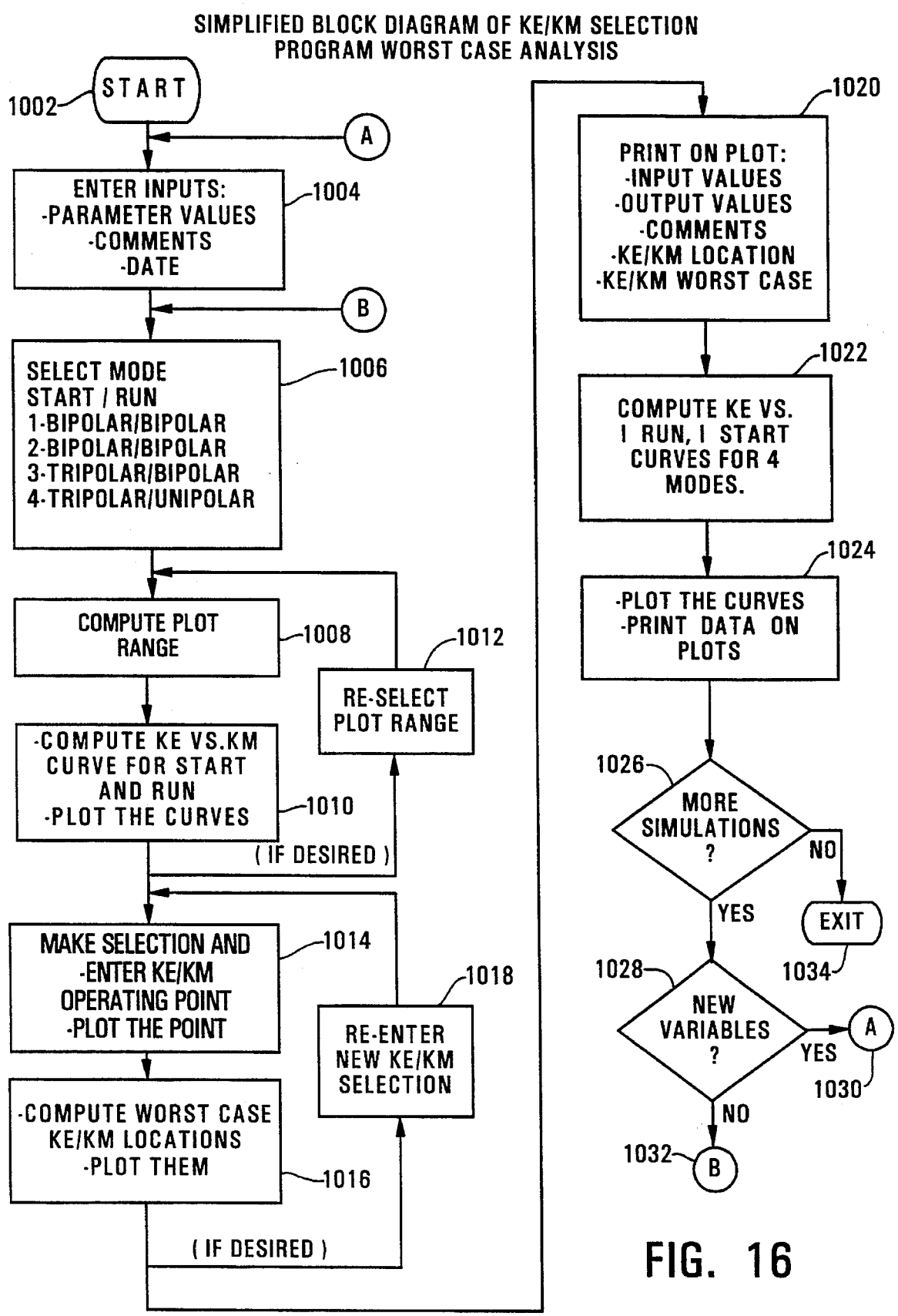
FIG. 16 is a flowchart illustrating the steps of a method for selecting $K_M$-$K_E$ values using worst-case analysis.

FIG. 16 is a flowchart showing the key steps of a preferred method for performing a worst-case analysis and determination of the optimal $K_M$ and $K_E$ values of FIG. 11. A user enters motor parameters pertaining to the stiction, cogging, bearing and running forces, the series resistance, the supply voltage, the $K_E$-min/$K_E$-peak and the $K_E$-avg/$K_E$-peak (step 1004). The user then selects a start/run mode (step 1006). A plot range is computed (step 1008) and the $K_M$ versus $K_E$ curves for the selected start/run mode are computed and plotted on a graph (step 1010). If desired, the plot range can then be modified and a new graph can be generated and plotted (step 1012).

When the initial $K_M$-$K_E$ graph is obtained, the user then enters a $K_M$-$K_E$ operating point (step 1014) which is plotted on the graph. The worst case $K_M$-$K_E$ locations for both start and run are computed (step 1016) and also plotted on the graph. If the worst case locations do not touch their respective $K_M$ versus $K_E$ start and run curves, another $K_M$-$K_E$ operating point is selected (step 1018) and new worst case locations are computed and plotted. This process continues until both worst case locations touch their respective curves, and the corresponding operating point is selected as the optimal $K_M$-$K_E$ values.

Once the optimal values of $K_M$ and $K_E$ have been determined, they are added to the graph (step 1020) and the $K_E$ versus ISTART and IRUN curves are computed and graphed (steps 1022, 1024). The user then considers whether more simulations are required. If so, new variables can be entered and the process repeated (steps 1028–1032). If not, the process ends (step 1034).

The result of the above described worst case analysis are $K_M$ and $K_E$ values which assure that spindle motor 16 can always be started using the bipolar mode or tripolar mode (depending on mode selection). However, these values may be unsuitable in terms of motor size or other design considerations such as start currents.

Figure 17:
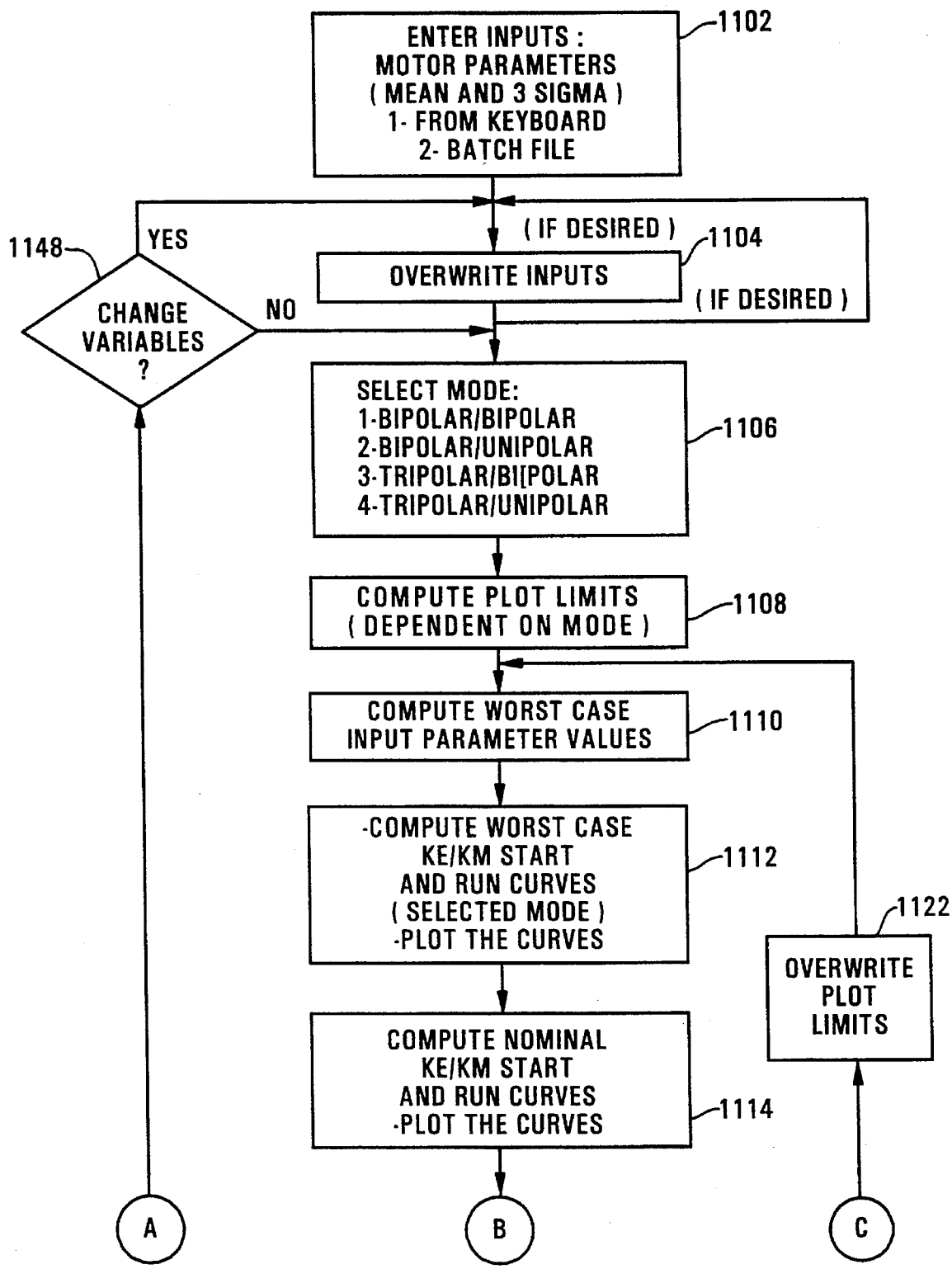
FIGS. 17–19 are flowcharts illustrating the steps of a method for selecting $K_M$-$K_E$ values using statistical analysis.
Figure 18:
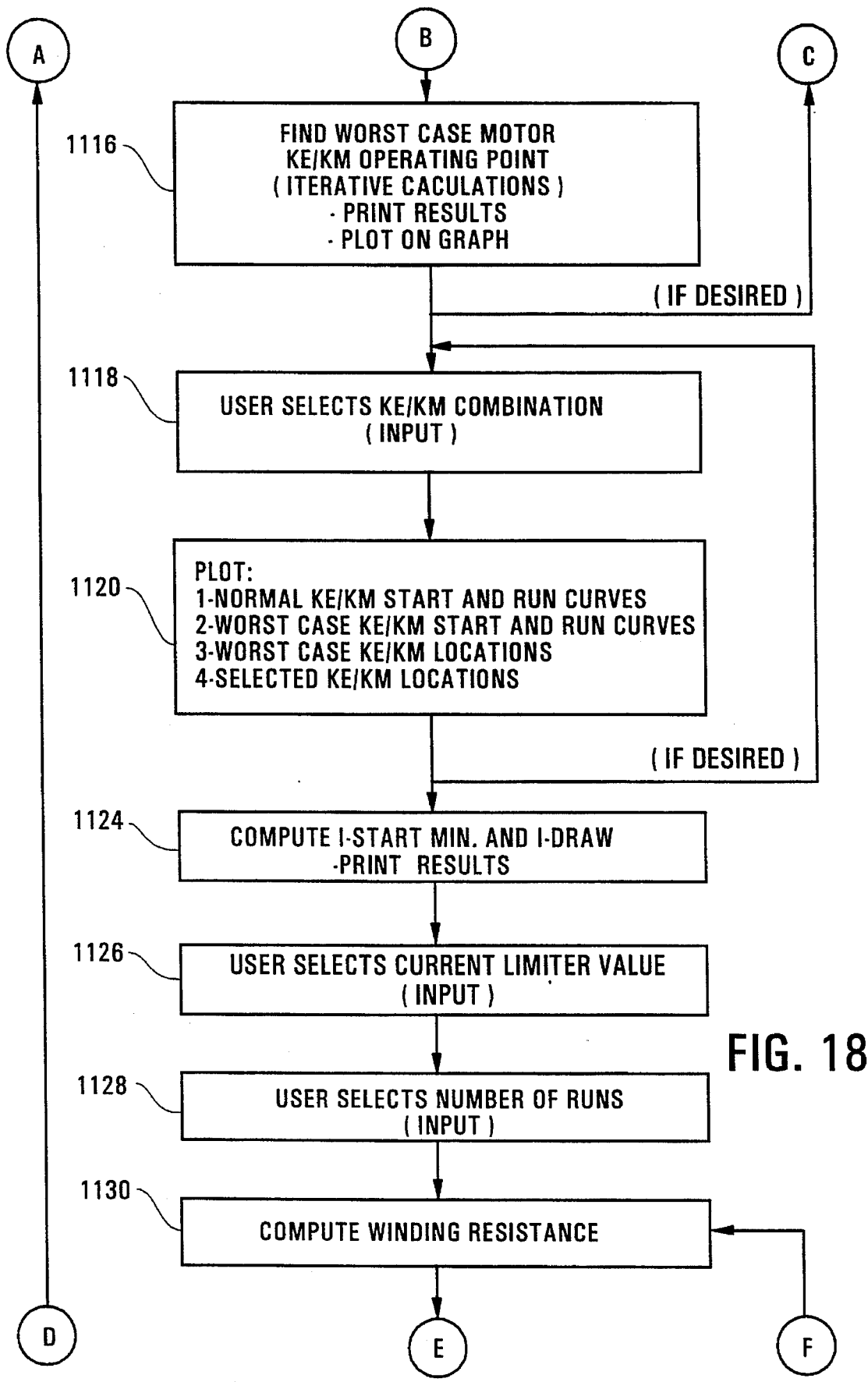
Figure 19:
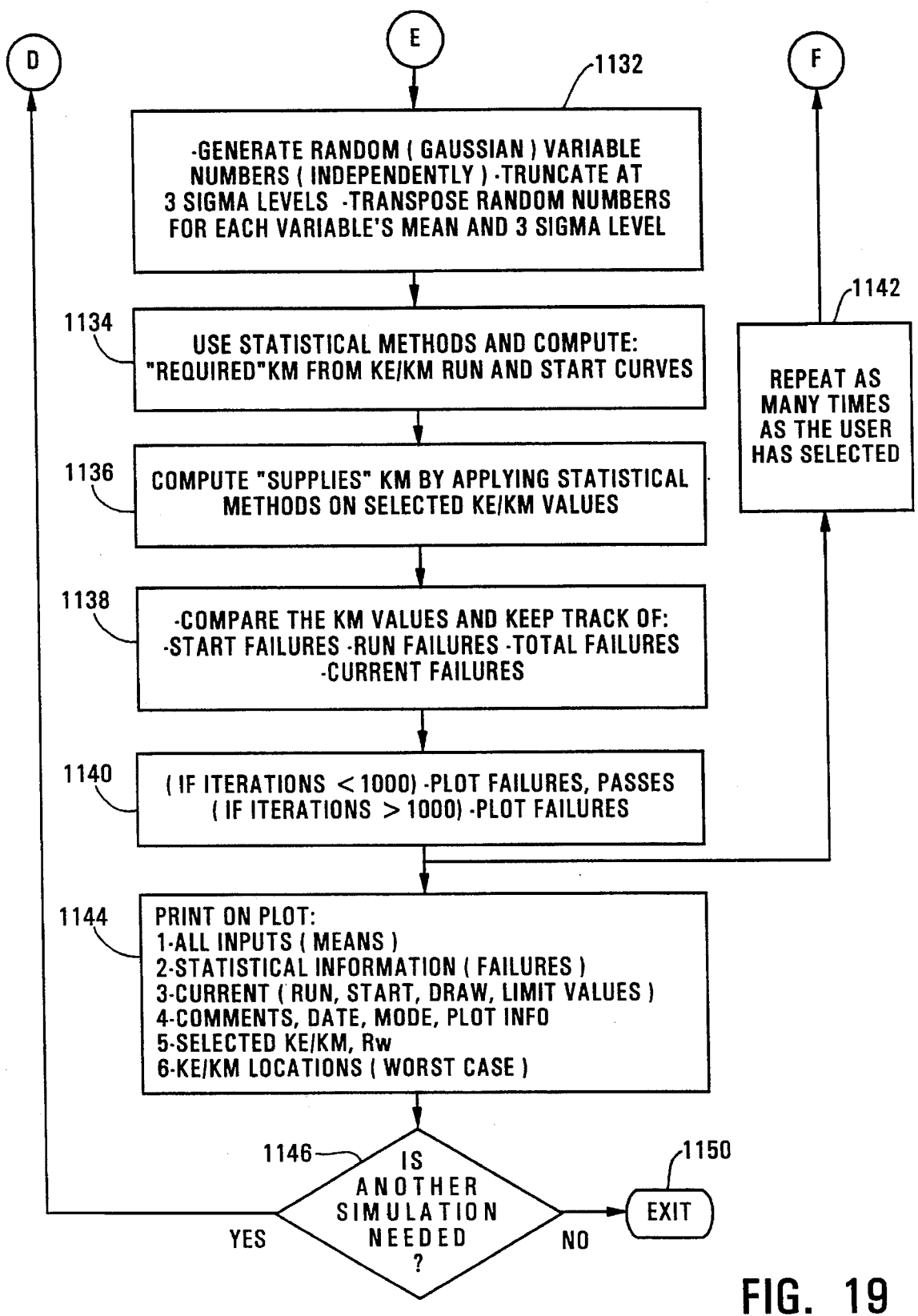

Referring now to FIGS. 17–19 and Tables 1–4, a flowchart showing the key steps of a preferred method for performing a statistical analysis and determination of the optimal $K_M$-$K_E$ values of FIG. 11 is shown. The user first enters the mean and 3-sigma (standard deviation) values for each of the design parameters shown on Tables 1–4 for the motor under consideration (step 1102). Alternatively, any desired sigma value may be entered. Note that any previously entered parameter values may be overwritten if desired (step 1104). The user then selects a start/run mode (step 1106) and the plot limits which depend on the start/run mode are computed (step 1108).

Next, a set of worst case input parameter values are computed (step 1110), along with worst case $K_M$ versus $K_E$ start and run curves for the selected start/run mode (step 1112). The worst case $K_M$ versus $K_E$ curves are plotted (step 1112). A set of nominal $K_M$ versus $K_E$ start and run curves for the selected start/run mode are also computed and plotted (step 1114). The worst case $K_M$-$K_E$ operating point is then interactively determined and plotted (step 1116).

The user then selects a $K_M$-$K_E$ combination (step 1118) and a set of typical and worst case $K_M$ versus $K_E$ start and run curves are computed and plotted, along with worst case $K_M$-$K_E$ values (step 1120). This process may be iterated if desired. A set of ISTART and IDRAW curves are then computed and plotted (step 1124). The user then selects a current limiter value (step 1126) and the number of runs for the simulation (step 1128). Next, the winding resistance for the spindle motor is computed (step 1130).

A series of random values are then generated (step 1132) and are used to compute a "required" $K_M$ from the $K_M$-$K_E$ start/run curves (step 1134). Next, a "supplied" $K_M$ is computed (step 1136) and is compared with the required $K_M$ (step 1138). If the "required" $K_M$ is greater than the "supplied" $K_M$, then a failure is recorded. The numbers of start, run, total, and current failures are recorded. If the number of iterations is less than a preselected number, typically 1000, both the failures and passes are plotted (step 1140). However, if the number of iterations is greater than 1000, only the failures are plotted. Finally, the graph is completed by plotting all input parameters, statistical information, and any comments on the graph or in a table (step 1144).

Figure 20:
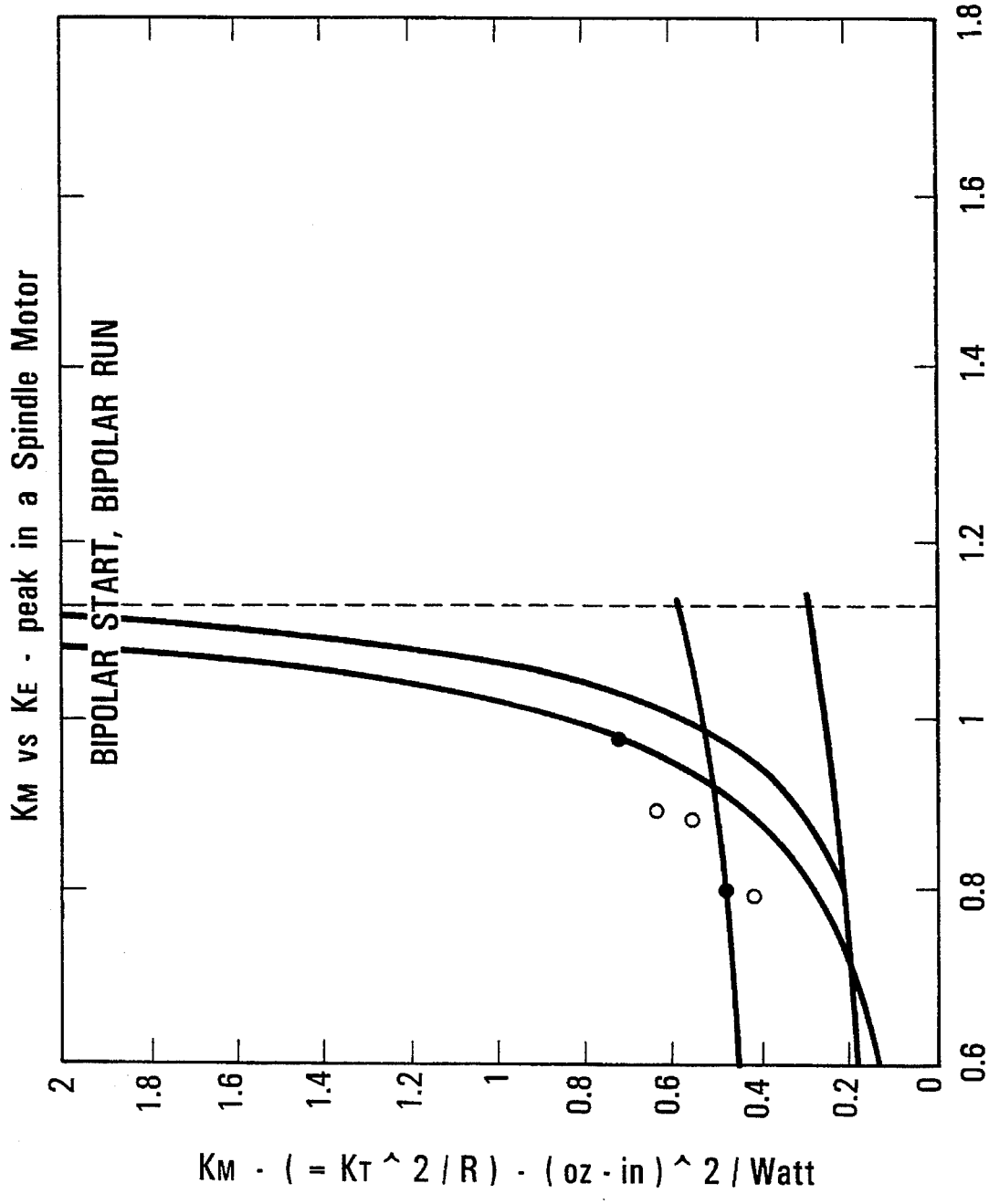
FIGS. 20–23 are graphs which plot the optimal $K_M$ versus $K_E$ values for bipolar start/unipolar run and for tripolar start/bipolar run.
Figure 21:
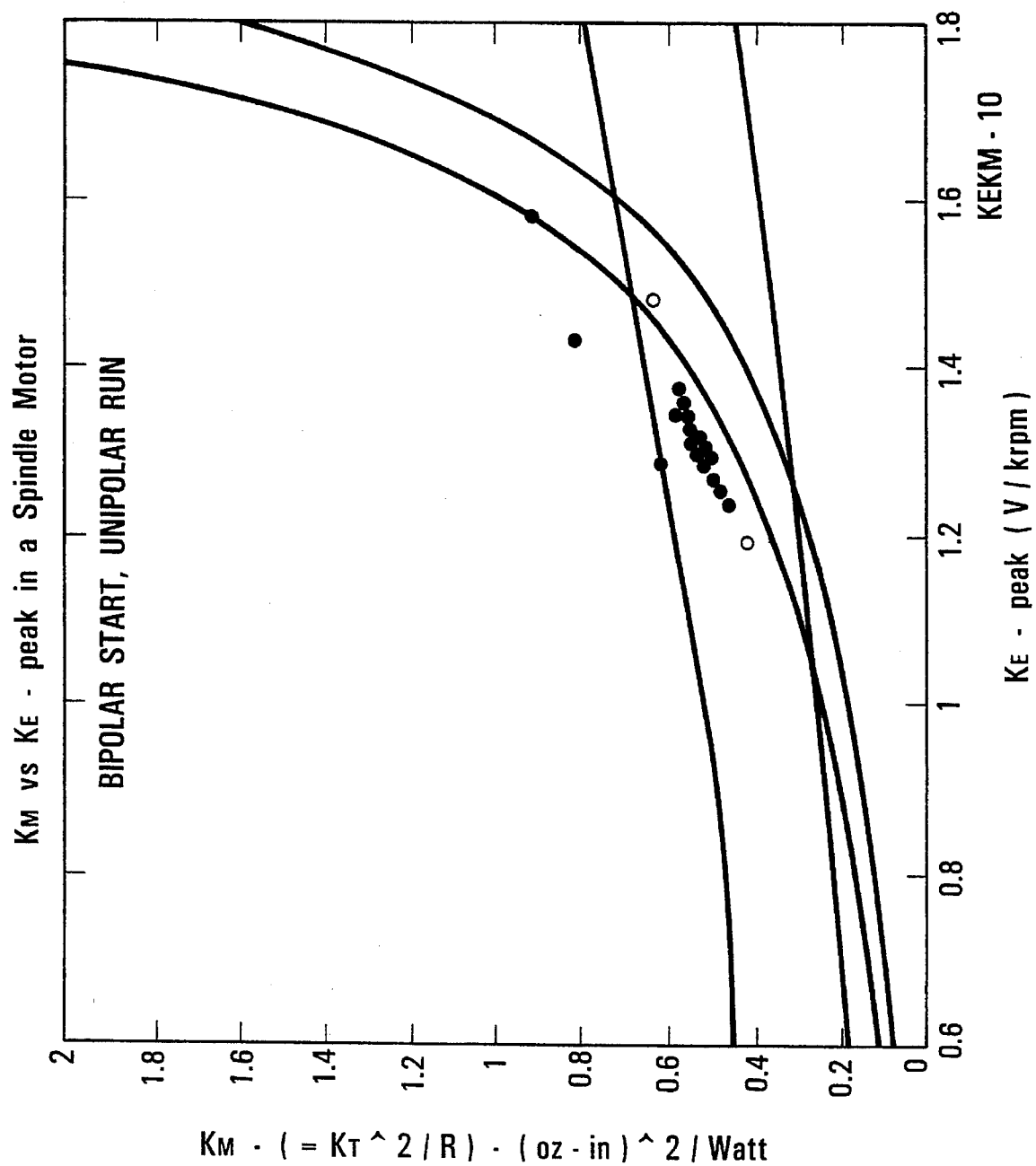

FIGS. 20 and 21, along with corresponding Tables 1 and 2, show the start current values for a typical bipolar start/run (0.9976 mA) and a typical bipolar start/unipolar run (0.6503) mA). Table 1 also gives the input parameters and the selected $K_M$ and $K_E$ values for bipolar start/run (0.55 and 0.88, respectively), while Table 2 gives the input parameters and the selected $K_M$ and $K_E$ values for bipolar start/unipolar run (0.55 and 1.35, respectively). Note that in the case of the unipolar run mode, the effective $K_E$ value will be approximately 0.577 of the 1.35 value.

TABLE 1

TYPICAL EXAMPLE
BIPOLAR START, BIPOLAR RUN $K_E$–$K_M$ Information

| | |
|---|---|
| $K_E$ intersect = 0.9228 | Ilimit = 1 |
| $K_M$ interest = 0.4982 | Istrtmin = 0.9976 |
| $K_E$ worst = 0.8864 | Istdraw = 0.9672 |
| $K_M$ worst = 0.6221 | Irunnom = 0.2357 |
| $K_E$ selected = 0.88 | Design Statistics |
| | |
| $K_M$ selected = 0.55 | Total number = 10000 |
| Input Parameters (mean value) | Total Failures = 0 |
| | |
| $T_{St}$ (oz. in) = 0.5097 (Gaussian) | Run Failures = 0 |
| $T_C + T_B = 0$ | Start Failures = 0 |
| Mag. Temp. Coef = −0.001 | Current Fail. = 0 |
| $T_{Run}$ (oz. in) = 0.25 | R-wind. = 2.566 |
| ω (krmp) = 3.8 | |
| $R_s$ (Ohms) = 1.847 | |
| $V_S$ (Volts) = 5 | |
| $V_{Fd}$ (volts) = 0.2 | |
| T(C) hot/cold = 65/5 | |
| $K_{Emn2pk}$ ratio = 0.84 | |
| $K_{Eav2pk}$ ratio = 0.93 | |

TABLE 2

TYPICAL EXAMPLE
BIPOLAR START, UNIPOLAR RUN $K_E$–$K_M$ Information

| | |
|---|---|
| $K_E$ intersect = 1.485 | Ilimit = 0.65 |
| $K_M$ interest = 0.6648 | Istrtmin = 0.6503 |
| $K_E$ worst = 1.439 | Istdraw = 0.5332 |
| $K_M$ worst = 0.7988 | Irunnom = 0.3093 |
| $K_E$ selected = 1.35 | Design Statistics |
| | |
| $K_M$ selected = 0.55 | Total number = 10000 |
| Input Parameters (mean value) | Total Failures = 21 |
| | |
| $T_{St}$ (oz. in) = 0.5097 (Gaussian) | Run Failures = 0 |
| $T_C + T_B = 0$ | Start Failures = 21 |
| Mag. Temp. Coef = −0.001 | Current Fail. = 0 |
| $T_{Run}$ (oz. in) = 0.25 | R-wind. = 6.039 |
| ω (krmp) = 3.8 | |
| $R_s$ (Ohms) = 1.847 | |
| $V_S$ (Volts) = 5 | |
| $V_{Fd}$ (volts) = 0.2 | |
| T(C) hot/cold = 65/5 | |

TABLE 2-continued

TYPICAL EXAMPLE
BIPOLAR START, UNIPOLAR RUN $K_{Emn2pk}$ ratio = 0.84
$K_{Eav2pk}$ ratio = 0.93

Figure 22:
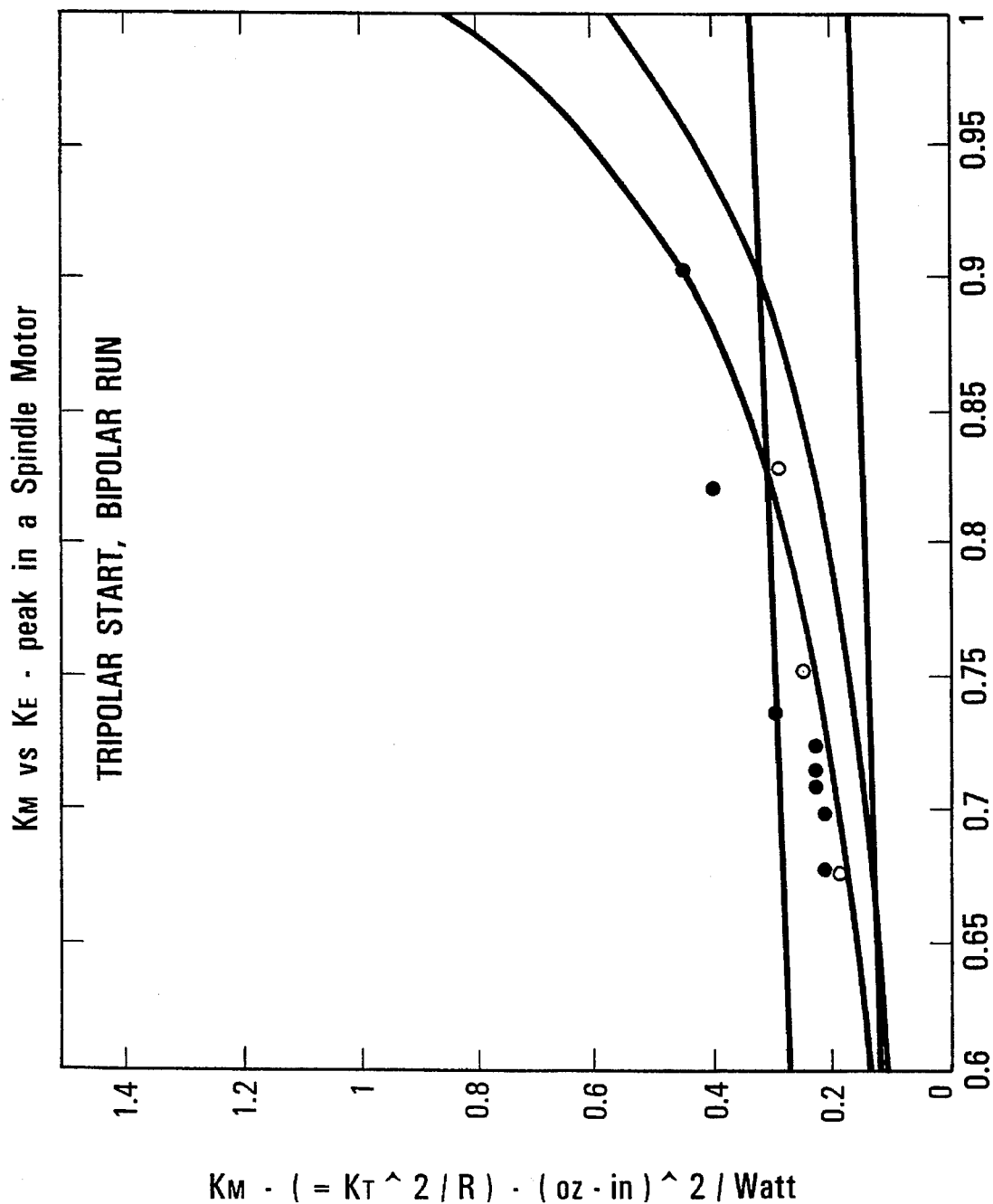
Figure 23:
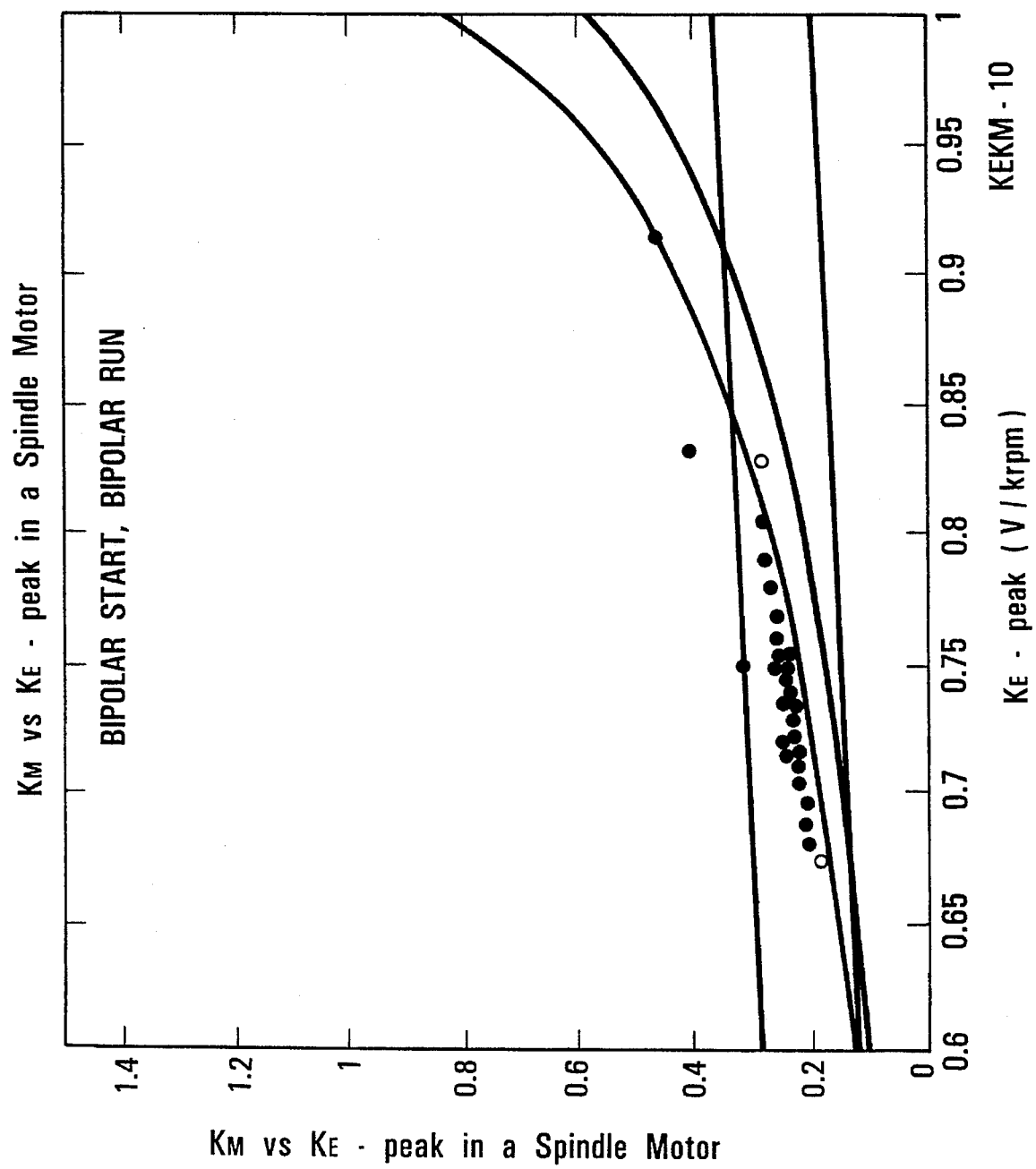

FIGS. 22 and 23, along with corresponding Tables 3 and 4, show the number of starts versus failures for the bipolar start/run of FIG. 14 (10,000 attempts, 79 failures) and the tripolar start/bipolar run of FIG. 15 (10,000 attempts, 6 failures). Tables 3 and 4 also give the input parameters and selected $K_M$ and $K_E$ values for the bipolar start/run and tripolar start/unipolar run cases. This clearly demonstrates the advantage of using tripolar driving when needed, to start the disk rotation.

TABLE 3

TYPICAL EXAMPLE
TRIPOLAR START, BIPOLAR RUN $K_E$-$K_M$ Information

| | |
|---|---|
| $K_E$ intersect = 0.8249 | Ilimit = 1 |
| $K_M$ interest = 0.3054 | Istrtmin = 0.061 |
| $K_E$ worst = 0.8173 | Istdraw = 0.0625 |
| $K_M$ worst = 0.3858 | Irunnom = 0.2939 |
| $K_E$ selected = 0.75 | Design Statistics |
| $K_M$ selected = 0.25 | Total number = 10000 |
| Input Parameters (mean value) | Total Failures = 6 |
| $T_{St}$ (oz. in) = 0.5097 (Gaussian) | Run Failures = 0 |
| $T_C + T_B = 0$ | Start Failures = 6 |
| Mag. Temp. Coef = −0.001 | Current Fail. = 0 |
| $T_{Run}$ (oz. in) = 0.25 | R-wind. = 4.101 |
| ω (krmp) = 3.8 | |
| $R_s$ (Ohms) = 1.847 | |
| $V_S$ (Volts) = 5 | |
| $V_{Fd}$ (volts) = 0.2 | |
| T(C) hot/cold = 65/5 | |
| $K_{Emn2pk}$ ratio = 0.84 | |
| $K_{Eav2pk}$ ratio = 0.93 | |

TABLE 4

TYPICAL EXAMPLE
BIPOLAR START, BIPOLAR RUN $K_E$-$K_M$ Information

| | |
|---|---|
| $K_E$ intersect = 0.8436 | Ilimit = 1 |
| $K_M$ interest = 0.3319 | Istrtmin = 0.9186 |
| $K_E$ worst = 0.8277 | Istdraw = 0.711 |
| $K_M$ worst = 0.4107 | Irunnom = 0.2766 |
| $K_E$ selected = 0.75 | Design Statistics |
| $K_M$ selected = 0.25 | Total number = 10000 |
| Input Parameters (mean value) | Total Failures = 79 |
| $T_{St}$ (oz. in) = 0.5097 (Gaussian) | Run Failures = 0 |
| $T_C + T_B = 0$ | Start Failures = 79 |
| Mag. Temp. Coef = −0.001 | Current Fail. = 0 |
| $T_{Run}$ (oz. in) = 0.25 | R-wind. = 4.101 |
| ω (krmp) = 3.8 | |
| $R_s$ (Ohms) = 1.847 | |
| $V_S$ (Volts) = 5 | |
| $V_{Fd}$ (volts) = 0.2 | |
| T(C) hot/cold = 65/5 | |
| $K_{Emn2pk}$ ratio = 0.84 | |
| $K_{Eav2pk}$ ratio = 0.93 | |

The foregoing description of the present invention is of a preferred embodiment which is subject to a number of modifications while remaining within the spirit and scope of the invention. Accordingly, the foregoing description of the preferred embodiment should only be viewed as illustrative and limited only by the following claims.

APPENDIX A

The following are the definitions of the parameters used in the above equations:

$T_S$—Stall Torque
$T_{Fc}$—Temperature Factor—(at coldest ambient temperature)
$K_E$—Voltage constant
$T_{Fh}$—Winding Resistance temperature factor, (at the hottest temperature)
$K_{Epk}$—Peak Voltage Constant
$V_M$—Motor Voltage
$K_{Eran2pk}$—Ratio of Peak Voltage Constant to Minimum Voltage Constant
$T_{ROOM}$—Room temperature (25° C.)
ω—Motor target run speed (in krpm)
$R_E$—Efficiency Ratio
$K_{Fc}$—Temperature factor of $K_e$, cold
$K_{Fh}$—Temperature factor of $K_c$, heated
$T_M$—Motor Torque (bipolar)
$T_{St}$—Stiction Torque
$T_C$—Cogging Torque
$T_B$—Bearing Torque
$T_R$—Running Torque
$I_S$—Start Current (bipolar)
$K_{Tmin\ h}$—Torque Constant, minimum, heated (bipolar)
$\Delta T_1$—Difference of temperature (between hot and room temperature)
$T_{Ah}$—Ambient Temperature, hot
$\gamma_M$—Coefficient of temperature (magnet)
$V_S$—Supply Voltage
$V_{Fd}$—Fixed Voltage drops
$R_S$—Series Resistance
$R_{Sen}$—Sense Resistance
$R_D$—Diode Resistance
$R_F$—FET Resistance
$R_{Wh}$—Winding Resistance, heated, bipolar
$R_W$—Winding Resistance, at room temperature (25° C. bipolar)
$\gamma_C$—Coefficient of temperature (copper)
P—Power dissipated
$I_W$—Winding current (bipolar)
$K_E$—Motor Back EMF Constant (bipolar)
$K_{Eph}$—Peak value of Motor Back EMF Constant Voltage (Bipolar)
$K_{Emin2pk}$—Ratio of minimum value of Back EMF value to peak Back EMF value
$K_{Epkh}$—Motor Back EMF Value, heated
$K_M$—Motor Constant, Figure of merit (bipolar)
$K_{M(start,bi)}$—Motor Constant, Start Condition, bipolar case
$I_R$—Motor Run current
$K_{Epkc}$—Motor Back EMF Constant, cold (bipolar)
$T_{Ac}$—Ambient Temperature, cold
$\Delta T_2$—Difference of temperature (between cold and room temperature)
$K_{Tav}$—Average value of Torque Constant
$K_{Tav2pk}$—Ratio of average Torque Constant to peak Torque Constant value
$R_{Wc}$—Winding Resistance, cold (bipolar)
θ—Coefficient of thermal resistivity of the motor
$K_{M(run,bi)}$—Motor Constant, Run Condition, bipolar case
$T_m{}^t$—Motor Torque (tripolar)
$K_{T_{minh}}{}^t$—Motor Torque Constant, minimum, heated (tripolar)

$I_S{}^t$—Start Current (tripolar)
$R_{stri}{}^t$—Series Resistance (Tripolar)
$R_{wh}{}^t$—Winding Resistance, hot, tripolar
$K_T{}^t$—Torque Constant (tripolar)
$K_{M(start,tri)}$—Motor Constant, Start Condition, tripolar case
$V_m{}^u$—Motor Voltage (unipolar)
$I_R{}^u$—Motor Run Current (unipolar)
$R_{wc}{}^u$—Motor Winding Resistance, cold unipolar
$K_{Epkc}{}^u$—Motor Back EMF Constant, peak value cold, unipolar
$K_{Eav}{}^u$—Motor Back EMF average value room temperature, unipolar
$K_{Tav}{}^u$—Motor Torque Constant, average value, room temperature, unipolar
$K_{M(run,uni)}$—Motor Constant, Run condition unipolar case

What is claimed is:

1. A method for controlling a rotating disk data storage device, used with a host computer, said data storage device including one or more rotatable data storage disks each having a plurality of concentric data tracks on one or more disk surfaces thereof; a spindle for rotatably supporting said data storage disks; a spindle motor for rotationally driving said spindle, said spindle motor having three or more motor windings; an actuator for supporting one or more read/write transducer heads adjacent to said one or more disk surfaces in an air bearing manner; and spindle motor driver and control circuitry for driving said spindle motor so as to rotate said one or more rotatable data storage disks at a desired rotational velocity: said method for controlling said rotating disk data storage device, comprising the steps of:

starting said rotational driving of said spindle motor using a tripolar driving mode, and accelerating in said tripolar driving mode;

switching said rotational driving of said spindle motor to a second driving mode during said acceleration before said acceleration drops significantly below a minimum desired acceleration, said second driving mode allowing a higher rotational velocity of said one or more rotatable storage disks than said tripolar driving mode;

stopping said rotational driving of said spindle motor accordance with a command from said host computer or a predetermined time after said data has been transferred between said host interface/disk controller circuitry and said one or more disk surfaces; and repeating skid starting and switching steps in response to a new host computer data request;

wherein said tripolar driving mode can accelerate said one or more rotatable storage disks up to a first rotational velocity, and said step of switching said rotational driving of said spindle motor from said tripolar driving mode to said second driving mode comprises switching said driving mode at a rotational velocity of less than eighty-five percent of said first rotational velocity for a fixed nominal supply voltage; and wherein said step of switching driving modes comprises monitoring spindle motor acceleration during said tripolar driving mode and switching when said acceleration drops below a predetermined value.

2. A method for controlling a rotating disk data storage device, used with a host computer, said data storage device including one or more rotatable data storage disks each having a plurality of concentric data tracks on one or more disk surfaces thereof; a spindle for rotatably supporting said data storage disks; a spindle motor for rotationally driving said spindle, said spindle motor having two or more motor windings; an actuator for supporting one or more read/write transducer heads adjacent to said one or more disk surfaces in an air bearing manner; and spindle motor driver and control circuitry for driving said spindle motor so as to rotate said one or more rotatable data storage disks at a desired rotational velocity for a fixed supply voltage; said method of controlling said rotating disk storage device, comprising the steps of:

starting said rotational driving of said spindle motor using a first driving mode and accelerating said one or more rotatable storage disks using said first driving mode;

monitoring acceleration of the spindle motor during said first driving mode;

switching said rotational driving of said spindle motor to a second driving mode when said acceleration drops below a predetermined value during said first mode, said second driving mode accelerating said one or more rotatable storage disks to a target rotational velocity; and stopping said rotational driving of said spindle motor in accordance with a command from said host computer or a predetermined time after said data has been transferred between said host interface/disk controller circuitry and said one or more disk surfaces.

* * * * *